US011797050B2

(12) United States Patent
Lim et al.

(10) Patent No.: US 11,797,050 B2
(45) Date of Patent: Oct. 24, 2023

(54) ELECTRONIC DEVICES WITH SLIDING DEVICE HOUSINGS AND TRANSLATING FLEXIBLE DISPLAYS AND CORRESPONDING METHODS

(71) Applicant: Motorola Mobility LLC, Chicago, IL (US)

(72) Inventors: Yong-Ho Lim, Kildeer, IL (US); Thomas Gitzinger, Chicago, IL (US); Steve C Emmert, McHenry, IL (US); Daniel P Groebe, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/706,383

(22) Filed: Mar. 28, 2022

(65) Prior Publication Data
US 2023/0305593 A1    Sep. 28, 2023

(51) Int. Cl.
*G06F 1/16*    (2006.01)

(52) U.S. Cl.
CPC .......... *G06F 1/1624* (2013.01); *G06F 1/1652* (2013.01)

(58) Field of Classification Search
CPC .............................. G06F 1/1624; G06F 1/1652
See application file for complete search history.

(56) References Cited

U.S. PATENT DOCUMENTS

| 10,025,355 | B2 | 7/2018 | Bohn |
| 10,491,725 | B1 | 11/2019 | Harmon et al. |
| 11,166,388 | B2 * | 11/2021 | Diboine .................. G06F 3/041 |
| 11,561,584 | B2 * | 1/2023 | Ha .......................... G06F 1/1626 |
| 11,586,243 | B2 * | 2/2023 | Yildiz ................... G06F 1/1681 |
| 2016/0143131 | A1 * | 5/2016 | Ahn ........................ H05K 1/028 361/749 |
| 2020/0267246 | A1 * | 8/2020 | Song ...................... H05K 1/148 |
| 2021/0212221 | A1 * | 7/2021 | Diboine .................. H02K 7/06 |
| 2021/0373603 | A1 * | 12/2021 | Feng ....................... G06F 1/1624 |
| 2021/0405696 | A1 * | 12/2021 | Ahn ........................ G06F 1/1647 |

OTHER PUBLICATIONS

"Bohle MasterTrack FT Components | Glass Hardware", Unknown publication date, but believed to be prior to filing of present application; Viewed online Mar. 1, 2022 at https://www.bohle-america.com/shop/glass-hardware/architectural-glas . . . mastertrack-ft-sliding-systems/4908/bohle-mastertrack-ft-components.

(Continued)

*Primary Examiner* — Rockshana D Chowdhury
(74) *Attorney, Agent, or Firm* — Philip H. Burrus, IV

(57) ABSTRACT

An electronic device includes a first device housing and a second device housing that is slidable along the first device housing. The electronic device includes a flexible display and a slider framework fixedly coupled to the first device housing. A display mover slidably couples the flexible display to the slider framework, while a housing mover slidably couples the second device housing to the slider framework. An actuator coupled between the display mover and the housing mover causes the display mover and the housing mover to slide symmetrically in opposite directions along the slider framework when the second device housing slides relative to the first device housing between a closed position and an open position.

20 Claims, 14 Drawing Sheets

(56) References Cited

OTHER PUBLICATIONS

"Linkage Mechanisms", Unkonwn exact publication date but believed to be prior to filing of present application; viewed online at https://technologystudent.com/cams/link1.htm ; Copyright 2020.
Jurrien, Ilse , "Oppo rollable smartphone with expandable display", Published Dec. 4, 2021; Viewed online at https://en.letsgodigital.org/smartphones/oppo-rollable-phone/.

* cited by examiner

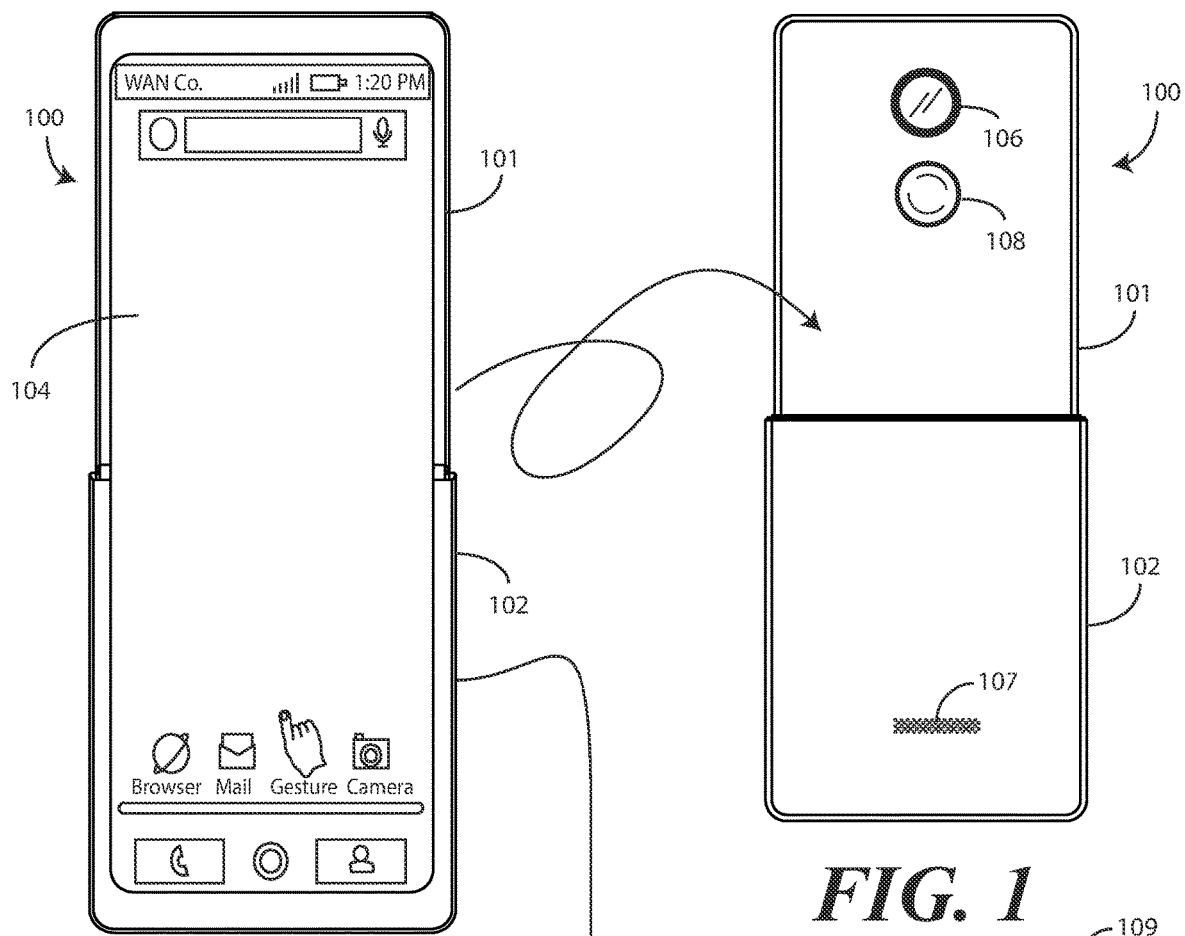
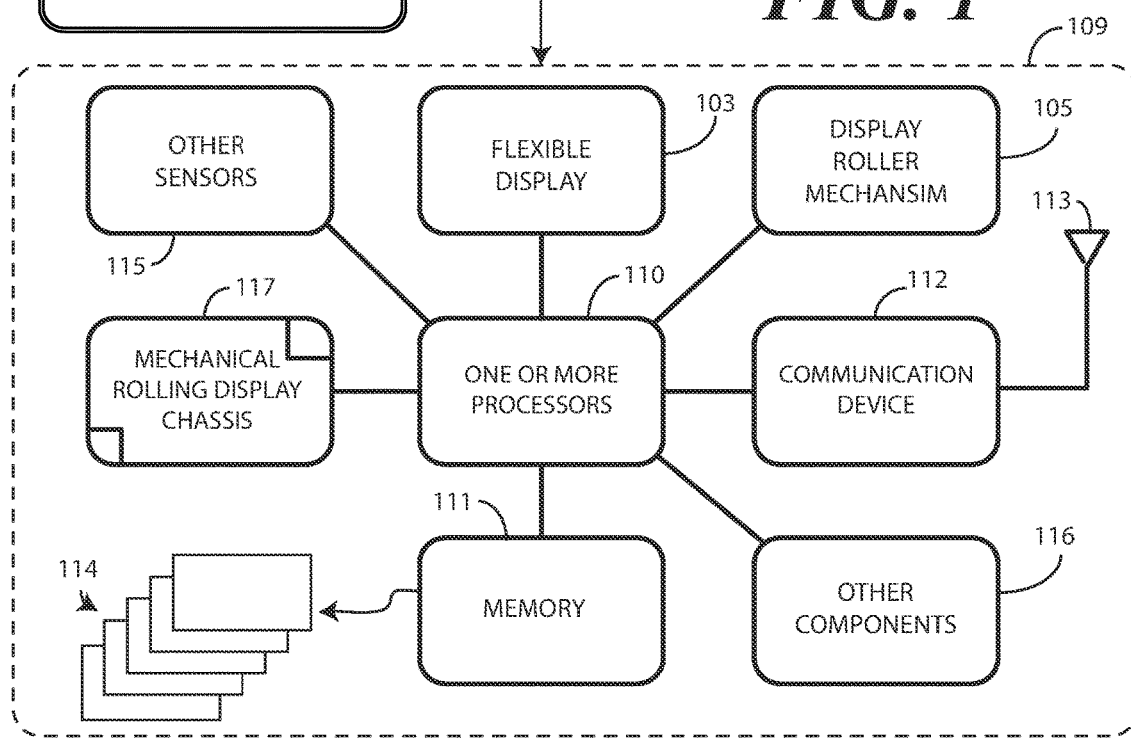
FIG. 1

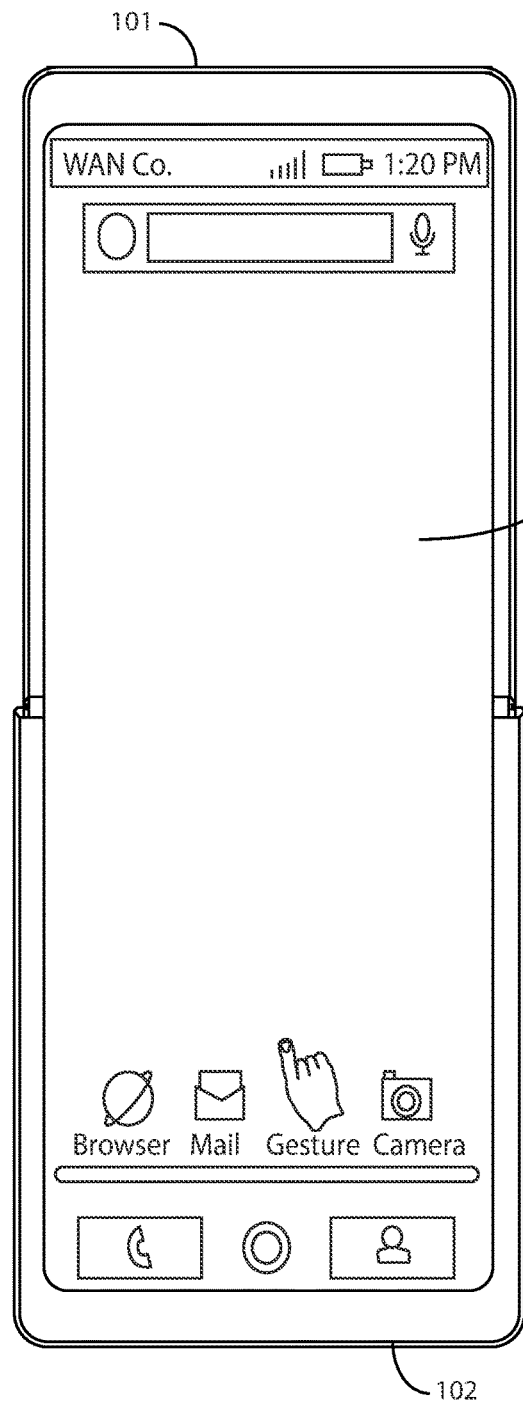 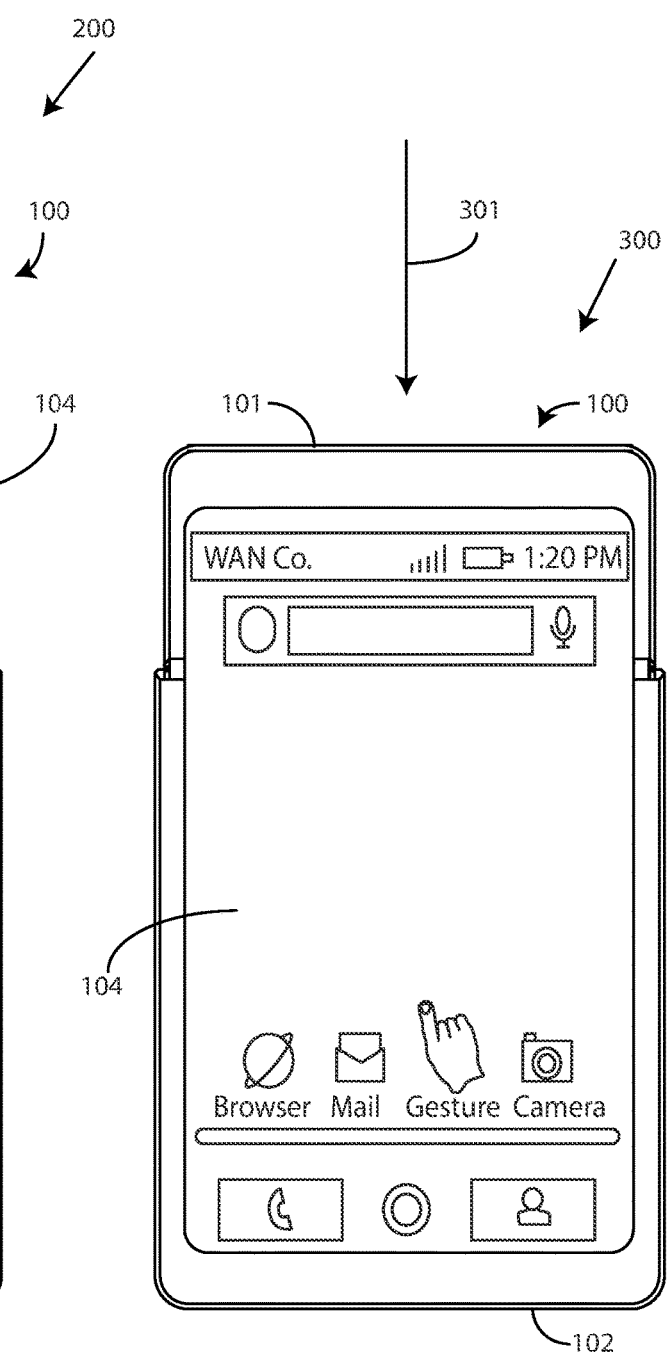
*FIG. 2*      *FIG. 3*

ELECTRONIC DEVICES WITH SLIDING DEVICE HOUSINGS AND TRANSLATING FLEXIBLE DISPLAYS AND CORRESPONDING METHODS

BACKGROUND

Technical Field

This disclosure relates generally to electronic devices, and more particularly to electronic devices having housings that slide relative to each other.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where one device housing slides relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell devices are relatively straight forward mechanically, sliding devices are more complicated, both mechanically and electrically. It would thus be desirable to have an improved electronic device that provides a slider construction operable with a flexible display.

BRIEF DESCRIPTION OF THE DRAWINGS

FIG. 1 illustrates one explanatory sliding electronic device in accordance with one or more embodiments of the disclosure.

FIG. 2 illustrates one explanatory sliding electronic device in an open position.

FIG. 3 illustrates one explanatory sliding electronic device in a closed position.

Figure 4:
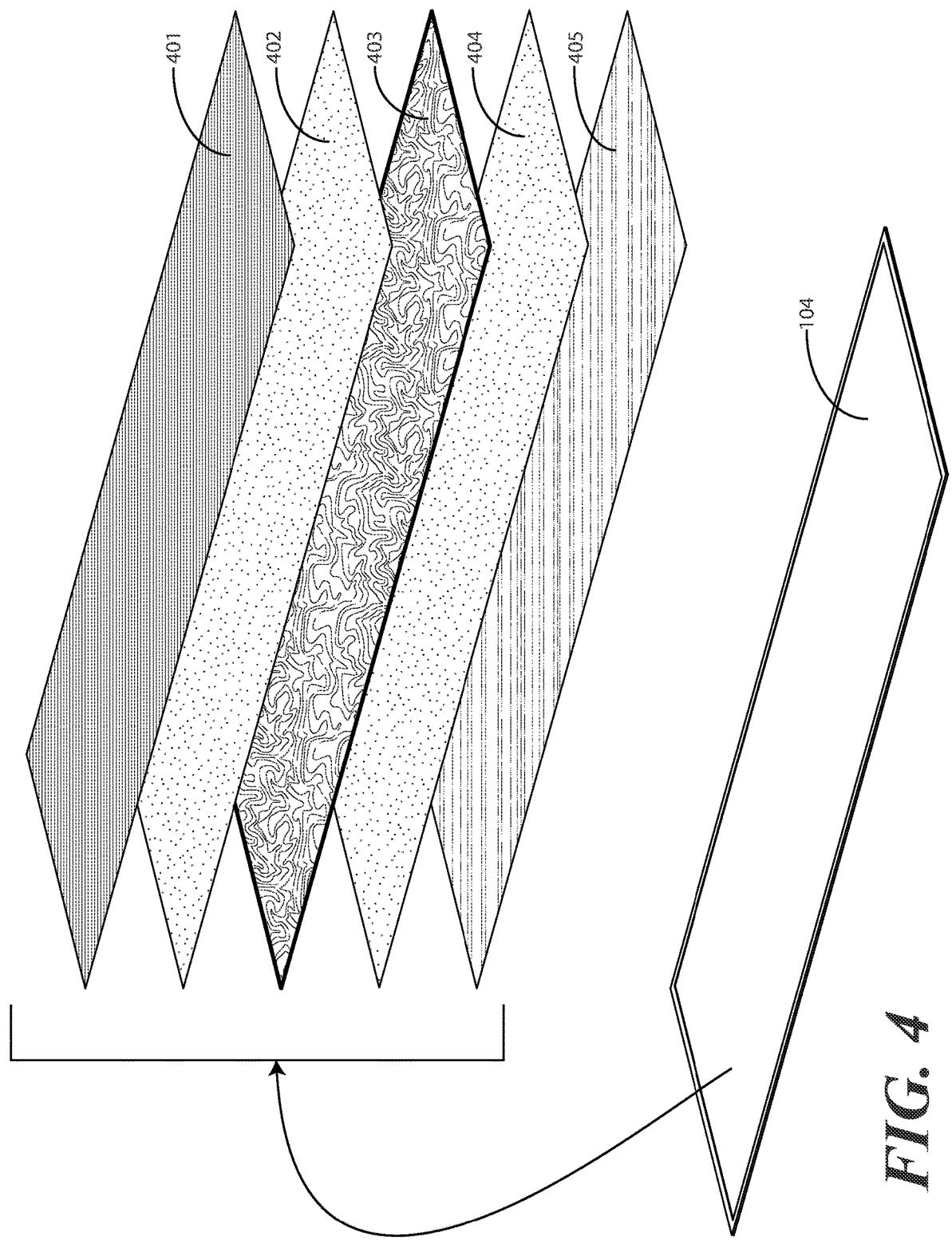
FIG. 4 illustrates an exploded view of one explanatory flexible display in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, the first device housing is configured to slide relative to the second device housing. Illustrating by example, in one explanatory embodiment, the first device housing slides into and out of the second device housing to change an overall length of the sliding electronic device. In other embodiments, the second device housing can slide into and out of the first device housing to achieve the same result. Accordingly, in one or more embodiments a sliding electronic device includes a first device housing and a second device housing that slide relative to each other to transition between a closed position, an open position, and a plurality of partially open positions therebetween.

In one or more embodiments, a flexible display is coupled to the first device housing and the second device housing. The flexible display engages a rotor in one device housing. When the first device housing and second device housing slide relative to each other, the flexible display wraps around the rotor to extend further from, or back into, the device housing in which the rotor is situated.

In one or more embodiments, a cross section of the flexible display defines a J-shape with a curved portion of the J-shape wrapped around the rotor and an upper portion of the J-shape passing across a translation surface of the device. When the sliding electronic device opens, the upper portion of the J-shape becomes longer as the flexible display wraps around the rotor and extends further out of the device housing. When the sliding electronic device closes, the upper portion of the J-shape becomes shorter as the reverse operation occurs. Thus, when the first device housing translates relative to the second device housing, the flexible display deforms at different locations as it wraps and passes around the rotor.

In one or more embodiments, the rotor not only facilitates the perceived "extension" of the flexible display that occurs during an opening operation, but also works to improve the reliability and usability of the flexible display. This is true because the rotor defines a service loop about which the flexible display curves. The service loop prevents the flexible display from being damaged or developing memory in the folded position when the electronic device is in the closed position.

In one or more embodiments, the flexible display comprises an assembly that includes a foldable substrate, a foldable display, and a fascia layer, as well as one or more adhesive layers to couple these components together. Embodiments of the disclosure contemplate that some of these layers are stiffer than others, while other layers are softer than others. For example, in one or more embodiments the foldable substrate is manufactured from stainless steel, while the adhesive layer is an optically transparent adhesive measuring only about fifty microns in thickness. The stainless-steel layer is stiffer than the adhesive layer, while the adhesive layer is softer than the stainless-steel layer. Similarly, the foldable display may be softer than the stainless steel, yet stiffer than the adhesive layer, and so forth.

Embodiments of the disclosure contemplate that these differing stiffness layers can cause the flexible display to not bend with as tight a bending radius around the rotor as would be desirable under a given set of loading forces. Said differently, for a given set of loading forces applied to the flexible display by the rotor, the flexible display may not bend sufficiently around desired radiuses so as to be positioned where desired when the electronic device is in the open position, the closed position, or there between. Illustrating by example, when the electronic device is in any of these positions, the portion of the flexible display extending from the rotor may not extend tangentially from the top of the rotor. This causes a "pillowing" effect where a portion of the flexible display bulges from the electronic device. Alternatively, the flexible display may attempt to "bunch" when the electronic device is closed.

To eliminate these mechanical issues, and to provide for a more even movement of a flexible display around a rotor in a sliding electronic device, in one or more embodiments an electronic device is equipped with a mechanical assembly that includes a slider framework fixedly coupled to the first device housing of a sliding electronic device. In one or more embodiments, a display mover is slidably coupled to the slider framework, as is a housing mover.

In one or more embodiments, one end of the flexible display is fixedly coupled to the second device housing, while the other end of the flexible display is coupled to the display mover. The housing mover is then coupled to the second device housing.

In one or more embodiments, an actuator is coupled between the display mover and the housing mover. In one or more embodiments, the actuator causes the display mover and the housing mover to slide symmetrically in opposite directions along the slider framework when the second device housing slides relative to the first device housing between a closed position and an open position.

Advantageously, embodiments of the disclosure provide an improved sliding mechanism for a flexible display in a sliding electronic device that eliminates crumpling and pillowing tendencies of the flexible display. Using such a mechanical assembly, the flexible display maintains a flat upper portion of the J-shape when sliding. Moreover, the flexible display doesn't tend to crumple or bunch when sliding into the first device housing. Instead, the display mover ensures a straight and true translation of the flexible display into the first device housing when the first device housing and second device housing slide from the open position to the closed position.

Advantageously, embodiments of the disclosure preserve the operability and functionality of the flexible display during sliding operations. Embodiments of the disclosure additionally prevent the application of elevated mechanical strains and stresses to the various layers of the flexible display. When the sliding operation is cycled numerous times, these elevated mechanical strains and stresses can cause mechanical failure in one or more of the layers of the flexible display. Advantageously, embodiments of the disclosure prevent this from occurring.

The actuator of the mechanical assembly can take a variety of forms. In one or more embodiments, the actuator comprises a spring actuator. Illustrating by example, the spring actuator can bias the display mover away from the housing mover when the electronic device is in either the closed position or the open position. The springs of the spring actuator can be compressed when the first device housing and second device housing are between the closed position and the open position. Thereafter, as the electronic device approaches either the closed position or the open position, the springs can extend and apply a loading force biasing the electronic device toward either position.

In other embodiments, the actuator can comprise a dual-shaft motor coupled to at least one timing belt. In one or more embodiments, the display mover and housing mover are also coupled to the at least one timing belt. When the timing belt is actuated, the display mover and the housing mover move symmetrically in opposite directions.

In still another embodiment the actuator comprises a first drive screw and a second drive screw. These drive screws can be coupled together by a gear assembly. When the display mover is coupled to the first drive screw and the housing mover is coupled to the second drive screw, actuation of either causes the display mover and housing mover to move symmetrically in opposite directions as the first drive screw and the second drive screw rotate.

In still other embodiments, the actuator comprises a first rack, a second rack, and a pinion. The first rack can be coupled to the display mover while the second rack can be coupled to the housing mover. When the pinion engages both the first rack or the second rack, actuation of either causes the display mover to move symmetrically in opposite directions as the first rack and second rack do the same. Other examples of actuators will be described below. Still others will be obvious to those of ordinary skill in the art having the benefit of this disclosure.

In one or more embodiments, a tensioner can be coupled between the display mover and the flexible display. The tensioner can comprise one or more springs that apply a loading force biasing an end of the flexible display toward an end of the first device housing. Said differently, in one or more embodiments the tensioner can comprise one or more sensors biasing an end of the flexible display away from the rotor. The inclusion of a tensioner advantageously allows for increased mechanical tolerances when designing the electronic device. The tensioner also helps to avoid the pillowing effect by applying a loading force that eliminates slack from the flat portions of the flexible display defining the partial J-shape.

In one or more embodiments, an electronic device comprises a first device housing slidably coupled to a second device housing. The electronic device also includes a flexible display having a first end and a second end.

In one or more embodiments, the electronic device includes a reverse motion link causing a display mover coupled to the second end of the flexible display and a housing mover coupled to the second device housing to travel symmetrically in opposite directions. As noted above, the electronic device can include a tensioner coupled between the second end of the flexible display and the display mover that applies a loading force removing slack from the flexible display. The tensioner advantageously causes the flexible display itself to remain flat.

In one or more embodiments, the first device housing that is configured to slide relative to a second device housing between a closed position and an open position. The flexible display is coupled to the second device housing and the display mover (or the tensioner coupled between the flexible display and the display mover) such that the flexible display translates along a translation surface defined by one or both of the first device housing and the second device housing.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 101 and a second device housing 102. In one or more embodiments, the first device housing 101 slides relative to the second device housing 102. In the illustrative embodiment of FIG. 1, the first device housing 101 can selectively slide into, and out of, the second device housing 102. However, in other embodiments the opposite will be true, with the second device housing 102 being selectively slidable into and out of the first device housing 101.

In one or more embodiments, one of the first device housing 101 or second device housing 102 includes rails that couple to tracks in the other of the first device housing 101 or the second device housing 102. For instance, the first device housing 101 can have rails that couple to tracks in the second device housing 102. In another embodiment, the first device housing 101 may have a rail and a track, with the second device housing 102 having a complementary rail and track that engage the rail and track of the first device housing 101 to facilitate the sliding operation. Other techniques that allow the first device housing 101 and the second device housing 102 to slide relative to each other between a closed position (shown below in FIG. 3) and the open position of FIG. 1 will be obvious to those of ordinary skill in the art having the benefit of this disclosure.

In one or more embodiments the first device housing 101 and the second device housing 102 are manufactured from a rigid material such as a rigid thermoplastic, metal, or composite material, although other materials can be used. Illustrating by example, in one illustrative embodiment the first device housing 101 and the second device housing 102 are manufactured from aluminum. Still other constructs will be obvious to those of ordinary skill in the art having the benefit of this disclosure.

In the illustrative embodiment of FIG. 1, the electronic device 100 includes a single sliding mechanism where the first device housing 101 slides relative to the second device housing 102. However, in other embodiments two or more sliding mechanisms can be incorporated into the electronic device 100 to allow it to slide at multiple locations, such as in a telescoping configuration.

This illustrative electronic device 100 of FIG. 1 includes a display 103. The display 103 can optionally be touch-sensitive. Users can deliver user input to the display 103 of such an embodiment by delivering touch input from a finger, stylus, or other objects disposed proximately with the display 103.

In one embodiment, the display 103 is configured as an organic light emitting diode (OLED) display fabricated on a flexible plastic substrate, thereby making the display 103 a flexible display 104. This allows the display 103 to be flexible so as to deform around a display roller mechanism 105, one example of which is a rotor that will be shown and described below with reference to FIG. 5, when the first device housing 101 slides relative to the second device housing 102. When a flexible display 104 is used, in one or more embodiments an OLED is constructed on flexible plastic substrates can allow the flexible display 104 to bend with various bending radii around the display roller mechanism 105.

In one or more embodiments the flexible display 104 may be formed from multiple layers of flexible material such as flexible sheets of polymer or other materials. In this illustrative embodiment, the flexible display 104 is fixedly coupled to the first device housing 101 and extends into the second device housing 102 and around the display roller mechanism 105. The flexible display 104 spans the engagement line at which the first device housing 101 slides into, and out of, the second device housing 102 in this illustrative embodiment.

Features can be incorporated into the first device housing 101 and/or the second device housing 102. Examples of such features include a camera 106 or an optional speaker port 107, which are shown disposed on the rear side of the electronic device 100 in this embodiment but could be placed on the front side as well. In this illustrative embodiment, a user interface component 108, which may be a button, fingerprint sensor, or touch sensitive surface, can also be disposed along the rear side of the first device housing 101. As noted, any of these features are shown being disposed on the rear side of the electronic device 100 in this embodiment, but could be located elsewhere, such as on the front side in other embodiments. In other embodiments, these features may be omitted.

The electronic device 100 can optionally include at least a second display. Illustrating by example, in one embodiment the camera 106 and the user interface component 108 can be moved to the second device housing 102, with a second display being positioned where the camera 106 and user interface component 108 are positioned in FIG. 1. The second display could be coupled to the second device housing 102 as well. In still other embodiments, a second display can be coupled to the first device housing 101, while a third display (not shown) is coupled to the second device housing 102. Thus, electronic devices configured in accordance with embodiments of the disclosure can include displays situated at different positions.

A block diagram schematic 109 of the electronic device 100 is also shown in FIG. 1. The block diagram schematic 109 includes one or more electronic components that can be coupled to a printed circuit board assembly disposed within either or both of the first device housing 101 or the second device housing 102 of the electronic device 100. The components of the block diagram schematic 109 can be electrically coupled together by conductors or a bus disposed along one or more printed circuit boards. For example, some components of the block diagram schematic 109 can be configured as a first electronic circuit fixedly situated within the first device housing 101, while other components of the block diagram schematic 109 can be configured as a second electronic circuit fixedly situated within the second device housing 102. A flexible substrate can then extend from the first electronic circuit in the first device housing 101 to the second electronic circuit in the second device housing 102 to electrically couple the first electronic circuit to the second electronic circuit.

In one or more embodiments, the electronic device 100 includes one or more processors 110. In one embodiment, the one or more processors 110 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 111, can optionally store the executable software code used by the one or more processors 110 during operation.

In this illustrative embodiment, the electronic device 100 also includes a communication circuit 112 that can be configured for wired or wireless communication with one or more other devices or networks. The networks can include a wide area network, a local area network, and/or personal area network. The communication circuit 112 may also utilize wireless technology for communication, such as, but are not limited to, peer-to-peer or ad hoc communications such as HomeRF, Bluetooth and IEEE 802.11, and other forms of wireless communication such as infrared technology. The communication circuit 112 can include wireless communication circuitry, one of a receiver, a transmitter, or transceiver, and one or more antennas 113.

In one embodiment, the one or more processors 110 can be responsible for performing the primary functions of the electronic device 100. For example, in one embodiment the one or more processors 110 comprise one or more circuits operable with one or more user interface devices, which can include the display 103, to present images, video, or other presentation information to a user. The executable software code used by the one or more processors 110 can be configured as one or more modules 114 that are operable with the one or more processors 110. Such modules 114 can store instructions, control algorithms, logic steps, and so forth.

In one embodiment, the one or more processors 110 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 110 may generate commands or execute control operations based on information received from the sensors 115 of the electronic device 100. The one or more processors 110 may also generate commands or execute control operations based upon information received from a combination of the one or more sensors 115, the flexible display 104, and/or the other input devices such as the user interface component 108. Alternatively, the one or more processors 110 can generate commands or execute control operations based upon information received from the one or more sensors 115 or the flexible display 104 alone. Moreover, the one or more processors 110 may process the received information alone or in combination with other data, such as the information stored in the memory 111.

The one or more sensors 115 may include a microphone, an earpiece speaker, a second loudspeaker (disposed beneath speaker port 107), and a user interface component 108 such as a button or touch-sensitive surface. The one or more other sensors 115 may also include key selection sensors, proximity sensors, a touch pad sensor, a touch screen sensor, a capacitive touch sensor, and one or more switches. Touch sensors may be used to indicate whether any of the user actuation targets present on the display 103 are being actuated. Alternatively, touch sensors disposed in the electronic device 100 can be used to determine whether the electronic device 100 is being touched at side edges or major faces of the first device housing 101 or the second device housing 102. The touch sensors can include surface and/or housing capacitive sensors in one embodiment. The other sensors 115 can also include audio sensors and video sensors (such as the camera 106).

The other sensors 115 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 116 operable with the one or more processors 110 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, a mechanical assembly 117 is operable within the electronic device 100. In one or more embodiments, the mechanical assembly 117 includes a slider framework that is fixedly coupled to the second device housing 102. As used herein, the term "framework" takes the ordinary English definition of a mechanical support structure supporting the other components coupled to the slider framework. These components include a display mover slidably coupling the flexible display 104 to the slider framework and a housing mover slidably coupling the first device housing 101 to the slider framework.

In one or more embodiments, the mechanical assembly 117 comprises an actuator coupled between the display mover and the housing mover. The actuator causes the display mover and the housing mover to slide symmetrically in opposite directions along the slider framework when the first device housing 101 slides relative to the second device housing 102 between the open position of FIG. 1 and the closed position of FIG. 3. The mechanical assembly 117 can include a flexible display support structure positioned between portions of the flexible display 104 and a translation surface defined by the second device housing 102.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in an open position 200. In the axially displaced open position 200, the first device housing 101 slides out of the second device housing 102, thereby revealing the flexible display 104. In such a configuration, front surfaces of the first device housing 101 and the second device housing 102 effectively define a plane. Since this illustrative embodiment includes a flexible display 104, the flexible display 104 has been elongated into a flat position.

Turning now to FIG. 3, illustrated therein is the electronic device 100 in a closed state. In this state, the first device housing 101 slides 301 into the second device housing 102 toward the second device housing 102 to a closed position 300. This causes the overall length of the electronic device 100 to get shorter. Additionally, the flexible display 104 inserts into the second device housing 102 by passing around the display roller mechanism (105) and becoming concealed within the second device housing 102. When the electronic device 100 opens again, the concealed portions of the flexible display 104 are again revealed.

In some embodiments, features can be included to further retain the electronic device 100 in the closed position 300. Illustrating by example, in another embodiment, a mechanical latch can be included to retain the first device housing 101 and the second device housing 102 in the closed position 300. In still another embodiment, magnets can be incorporated into the first device housing 101 and the second device housing 102. For instance, magnets can be placed in the first device housing 101 and the second device housing 102 to retain the first device housing 101 and the second device housing 102 in the closed position 300.

In still other embodiments, frictional elements can be incorporated into the mechanical interface existing between the first device housing 101 and the second device housing 102 to retain the first device housing 101 and the second device housing 102 in a particular position. A stator motor could be integrated into electronic device 100 to drive the first device housing 101 and second device housing 102 together and apart as well.

As will be explained below, in one or more embodiments the mechanical assembly (117) described above with reference to FIG. 1 can be used to retain the first device housing 101 and second device housing 102 in the closed position 300. Illustrating by example, in one or more embodiments the actuator of the mechanical assembly (117) comprises a spring actuator with springs biasing the display mover away from the housing mover when the electronic device 100 is in the closed position 300. Thus, this pre-loading force applied by the springs of the actuator works to retain the first device housing 101 and the second device housing 102 in the closed position 300. Still other mechanical structures and devices suitable for retaining the electronic device 100 in the closed position 300 will be obvious to those of ordinary skill in the art having the benefit of this disclosure.

Turning now to FIG. 4, illustrated therein is one example of a flexible display 104 configured in accordance with one or more embodiments of the disclosure. As shown in FIG. 4, in one or more embodiments the flexible display 104 comprises one or more layers that are coupled or laminated together to complete the flexible display 104. In one or more embodiments, these layers comprise a flexible protective cover 401, a first adhesive layer 402, a flexible display layer 403, a second adhesive layer 404, and a flexible substrate 405. Other configurations of layers suitable for manufacturing the flexible display 104 will be obvious to those of ordinary skill in the art having the benefit of this disclosure.

Beginning from the top of the layer stack, in one or more embodiments the flexible protective cover 401 comprises an optically transparent substrate. In one or more embodiments the flexible protective cover 401 may be manufactured from an optically transparent material such a thin film sheet of a thermoplastic material. Illustrating by example, in one embodiment the flexible protective cover 401 is manufactured from a layer of optically transparent polyamide having a thickness of about eighty microns. In another embodiment, the flexible protective cover 401 is manufactured from a layer of optically transparent polycarbonate having a thickness of about eighty microns. Other materials suitable for manufacturing the flexible protective cover 401 will be obvious to those of ordinary skill in the art having the benefit of this disclosure.

In one or more embodiments the flexible protective cover 401 functions as a fascia by defining a cover for the flexible display layer 403. In one or more embodiments the flexible protective cover 401 is optically transparent, in that light can pass through the flexible protective cover 401 so that objects behind the flexible protective cover 401 can be distinctly seen. The flexible protective cover 401 may optionally include an ultra-violet barrier. Such a barrier can be useful in improving the visibility of flexible display layer 403 in one or more embodiments.

Beneath the flexible protective cover 401 is a first adhesive layer 402. In one or more embodiments, the first adhesive layer 402 comprises an optically transparent adhesive. The optically transparent adhesive can be applied to two sides of a thin, optically transparent substrate such that the first adhesive layer 402 functions as an optically transparent layer having optically transparent adhesive on both sides. Where so configured, in one or more embodiments the first adhesive layer 402 has a thickness of about fifty microns. This optically transparent version of "double-sided tape" can then be spooled and applied between the flexible protective cover 401 and the flexible display layer 403 to couple the two together.

In other embodiments the first adhesive layer 402 will instead be applied between the flexible protective cover 401 and the flexible display layer 403 as an optically transparent liquid, gel, as a homogeneous adhesive layer, or in the form of another medium. Where so configured, the first adhesive layer 402 can optionally be cured by heat, ultraviolet light, or other techniques. Other examples of materials suitable for use as the first adhesive layer 402 will be obvious to those of ordinary skill in the art having the benefit of this disclosure. In one or more embodiments, the first adhesive layer 402 mechanically couples the flexible display layer 403 to the flexible protective cover 401.

In one or more embodiments, the flexible display layer 403 is situated between the flexible substrate 405 and the flexible protective cover 401. In other embodiments, a layer above the flexible display layer 403 can be configured with enough stiffness to make the flexible substrate 405 unnecessary. For example, in an embodiment where the flexible protective cover 401 is configured with enough stiffness to retain the flexible display 104 in the proper shape, the flexible substrate 405 may be omitted.

The flexible display layer 403 can optionally be touch-sensitive. In one or more embodiments, the flexible display layer 403 is configured as an organic light emitting diode (OLED) display layer coupled to the flexible substrate 405, which allows the flexible display layer 403 to bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 403 may be formed from multiple layers of flexible material such as flexible sheets of polymer or other materials. Illustrating by example, the flexible display layer 403 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 403 has a thickness of about 130 microns.

In one or more embodiments, to be touch sensitive the flexible display layer 403 includes a layer including one or more optically transparent electrodes. In one or more embodiments, the flexible display layer 403 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 403. Other layers suitable for inclusion with the flexible display layer 403 will be obvious to those of ordinary skill in the art having the benefit of this disclosure.

In one or more embodiments, the flexible display layer 403 is coupled to the flexible substrate 405 by a second adhesive layer 404. In one or more embodiments, to simplify manufacture, the second adhesive layer 404 is identical to the first adhesive layer 402 and comprises an optically transparent adhesive. However, since the second adhesive layer 404 is coupled between the flexible display layer 403 and the flexible substrate 405, i.e., under the flexible display layer 403, an optically transparent adhesive is not a requirement. The second adhesive layer 404 could be partially optically transparent or not optically transparent at all in other embodiments.

Regardless of whether the second adhesive layer 404 is optically transparent, in one or more embodiments the adhesive of the second adhesive layer 404 is applied to two sides of a thin, flexible substrate. Where so configured, in one or more embodiments the second adhesive layer 404 has a thickness of about fifty microns. This extremely thin version of "double-sided tape" can then be spooled and applied between the flexible display layer 403 and the flexible substrate 405 to couple the two together.

In other embodiments, as with the first adhesive layer 402, the second adhesive layer 404 will instead be applied between the flexible display layer 403 and the foldable substrate as a liquid, gel, as a homogeneous layer, or in the form of another medium. Where so configured, the second adhesive layer 404 can optionally be cured by heat, ultraviolet light, or other techniques. Other examples of materials suitable for use as the second adhesive layer 404 will be obvious to those of ordinary skill in the art having the benefit of this disclosure.

In one or more embodiments, the flexible display 104 comprises a flexible substrate 405. In one or more embodiments the flexible substrate is coupled to the flexible display layer 403 and defines a mechanical support for the flexible display layer 403 due to the fact that the flexible substrate 405 is the stiffest layer of the flexible display 104. In one or more embodiments the flexible substrate 405 is manufactured from stainless steel with a thickness of about forty microns. In another embodiment, the flexible substrate 405 is manufactured from a flexible plastic. Other materials from which the flexible substrate 405 can be manufactured will be obvious to those of ordinary skill in the art having the benefit of this disclosure.

Embodiments of the disclosure contemplate that some of the layers comprising the flexible display 104 are stiffer than others. Similarly, other layers of the flexible display 104 are softer than others. For example, where the flexible substrate 405 is manufactured from stainless steel, this layer is stiffer than either the first adhesive layer 402 or the second adhesive layer 404. In one or more embodiments, the stainless steel is stiffer than the flexible display layer 403 as well. In one or more embodiments, the flexible substrate 405 is the stiffest layer in the flexible display 104 while the first adhesive layer 402 and the second adhesive layer 404 are the softest layers of the flexible display 104. The flexible protective cover 401 and the flexible display layer 403 have a stiffness that falls between that of the flexible substrate 405 and the adhesive layers in one or more embodiments.

In one or more embodiments, the various layers of the flexible display 104 are laminated together in a substantially planar configuration. Said differently, in one or more embodiments the flexible substrate 405 is configured as a substantially planar substrate. The second adhesive layer 404 can be attached to this substantially planar substrate, with the flexible display layer 403 then attached to the second adhesive layer 404. The first adhesive layer 402 can be attached to the flexible display layer 403, with the flexible protective cover 401 attached to the first adhesive layer 402. To ensure proper coupling, the resulting flexible display layer 403 can be cured, such as in an autoclave at a predefined temperature for a predefined duration. Where employed, such curing allows any air bubbles or other imperfections in the various layers to be corrected. In one or more embodiments, since the flexible substrate 405 is configured as a substantially planar substrate, the resulting flexible display 104 is substantially planar as well.

Figure 5:
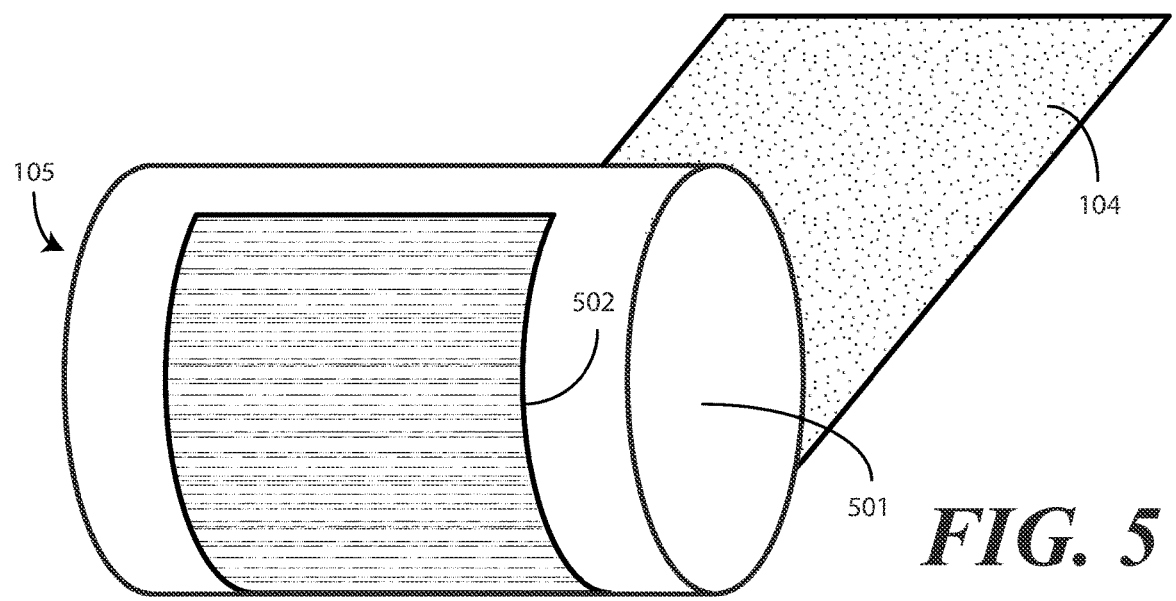
FIG. 5 illustrates one explanatory flexible display and rotor assembly configured in accordance with one or more embodiments of the disclosure.

Turning now to FIG. 5, illustrated therein is one explanatory display assembly configured for a sliding electronic device in accordance with one or more embodiments of the disclosure. In the illustrative embodiment of FIG. 5, the flexible display 104 wraps around a display roller mechanism 105. In this illustrative embodiment, the display roller mechanism 105 includes a rotor 501 that is positioned within a curvilinear section 502 of the flexible display 104. When placed within a device housing of a sliding electronic device, rotation of the rotor 501 causes a linear translation of the flexible display 104 across a translation surface or mechanical support by drawing the flexible display 104 around the rotor 501.

Figure 6:
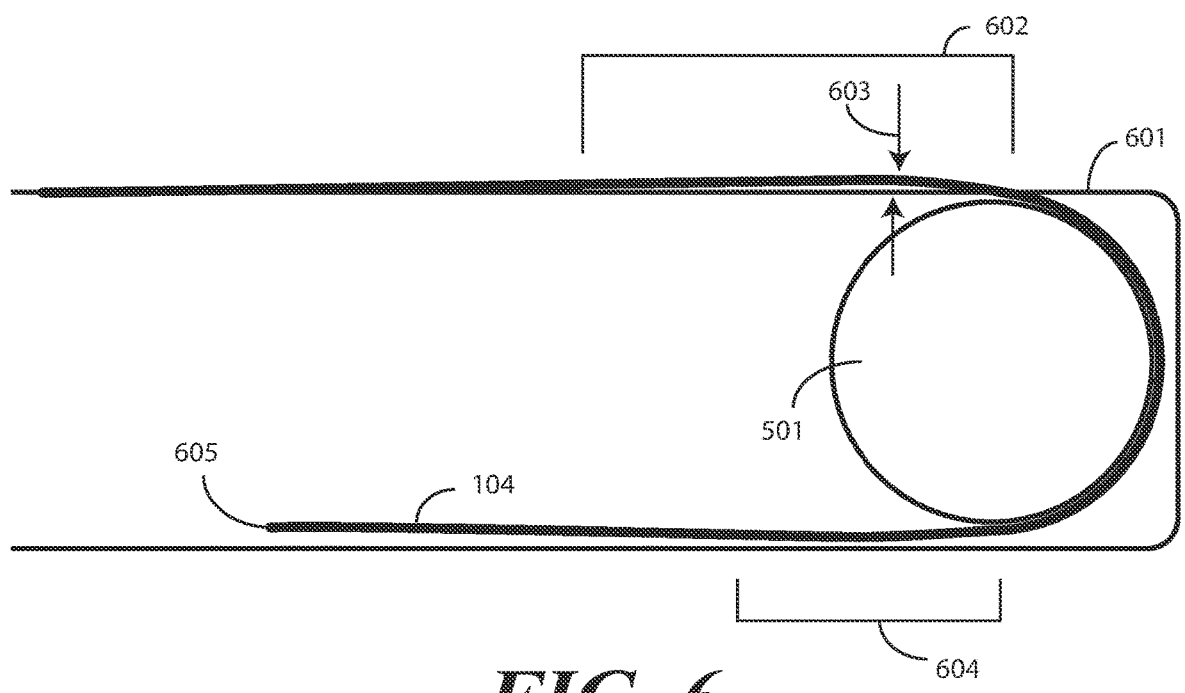
FIG. 6 illustrates one explanatory flexible display and rotor assembly situated within a device housing in accordance with one or more embodiments of the disclosure.

Turning now to FIG. 6, illustrated therein is a device housing 601 of a sliding electronic device with the rotor 501 and the flexible display 104 positioned therein. As described above with reference to FIG. 4, the flexible display 104 can include layers of differing stiffnesses. These differing stiffness layers can cause the flexible display 104 to not bend with as tight a bending radius as would be desirable under a given set of loading forces. Said differently, for a given set of loading forces applied to the flexible display 104, the flexible display 104 may not bend sufficiently around desired radiuses so as to be positioned where desired when the electronic device is in the open position, the closed position, or there between.

Illustrating by example, when the electronic device is in any of these positions, a portion 602 of the flexible display 104 extending distally from the rotor 501 may not extend tangentially from the top of the rotor 501. This causes a "pillowing" effect 603 where that portion 602 of the flexible display 104 bulges from the device housing 601 of electronic device. Similarly, when the rotor 501 rotates clockwise in the view of FIG. 6, a second portion 604 of the flexible display 104 can tend to crumple, bunch, snag, or otherwise not efficiently slide into the lower portion of the device housing 601 when the electronic device moves to the closed position.

To eliminate these issues, embodiments of the disclosure provide a reverse motion link comprising a display mover coupled to the second end 605 of the flexible display 104, a housing mover coupled to the other sliding device housing (not shown in FIG. 6), and an actuator. In one or more embodiments, the actuator causes the second portion 604 of the flexible display and the second device housing to travel symmetrically in opposite directions relative to the sliding device housing 601 when the electronic device moves from the closed position to the open position or, alternatively, from the open position to the closed position.

In one or more embodiments, a tensioner is then coupled between the display mover and the second portion 604 of the flexible display 104. In one or more embodiments, the tensioner comprises a plurality of springs that apply loading forces biasing the second portion 604 of the flexible display 104 toward the display mover, which is to the left and away from the rotor 501 in the view of FIG. 6.

Advantageously, in addition to allowing for increased manufacturing tolerances of the various components, the inclusion of the tensioner keeps the upper portion of the flexible display 104 flat, thereby eliminating the pillowing effect. Embodiments of the disclosure contemplate that the pillowing effect can cause the flexible display 104 to "feel" like it's moving when a user is delivering user input to the flexible display 104, especially along the portion 602 of the first device housing 101 that is experiencing the phenomena. Said differently, when delivering user input to the portion 602 of the flexible display 104 experiencing the pillowing effect 603, without the mechanical assembly (117) of embodiments of the disclosure and/or the mechanical assembly (117) and tensioner, a user may feel the flexible display 104 moving up and down slightly relative to the device housing 601. The inclusion of the mechanical assembly (117), with or without the tensioner, prevents both pillowing 603 in the first portion of the flexible display 104 and bunching, hanging, snagging, or other issues in the second portion 604 of the flexible display 104.

Figure 7:
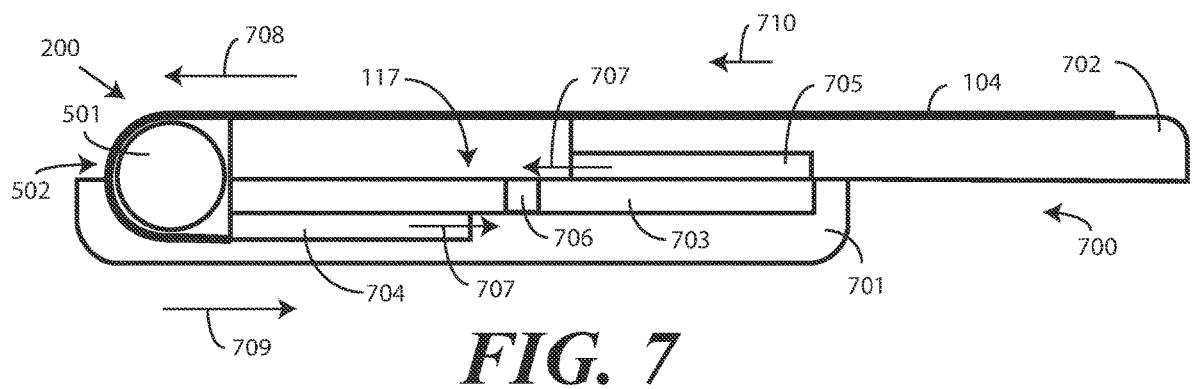
FIG. 7 illustrates a side sectional view of another explanatory flexible display and rotor assembly situated within a device housing of a sliding electronic device when the sliding electronic device is open.
Figure 8:
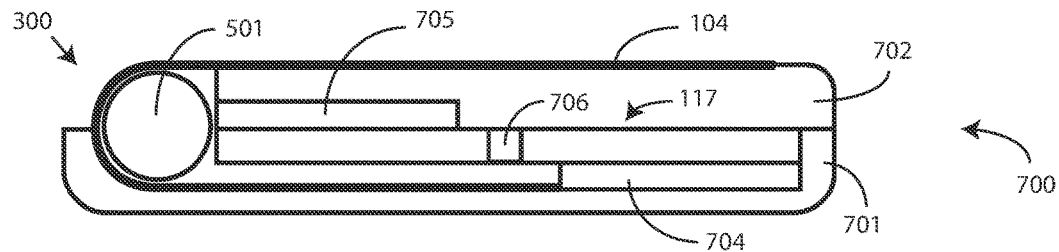
FIG. 8 illustrates a side sectional view the explanatory flexible display and rotor assembly of FIG. 7 situated within a device housing of a sliding electronic device when the sliding electronic device is closed.

Turning now to FIGS. 7-8, illustrated therein is one explanatory sliding electronic device 700 configured in accordance with one or more embodiments of the disclosure. The sliding electronic device 700 is shown in a cut-away view in FIGS. 7-8 so that the internal components, including the mechanical assembly 117, can be more readily seen. The sliding electronic device 700 is shown in the open position 200 in FIG. 7 and in the closed position 300 in FIG. 8.

As before, in one or more embodiments the electronic device 700 includes a first device housing 701 that is configured to slide relative to a second device housing between a closed position (300) and an open position 200. A flexible display 104 is included and is coupled to the second device housing 702 in this illustrative embodiment.

In one or more embodiments, the mechanical assembly 117 includes a slider framework 703, a display mover 704, and a housing mover 705. In this illustrative embodiment, the slider framework 703 is fixedly coupled to the first device housing 701. The display mover 704 slidably couples the flexible display 104 to the slider framework 703, while the housing mover 705 slidably couples the second device housing 702 to the slider framework 703. An actuator 706 is coupled between the display mover 704 and the housing mover 705.

In one or more embodiments, the actuator 706 causes the display mover 704 and the housing mover 705 to slide 707 symmetrically in opposite directions 708,709 along the slider framework 703 when the second device housing 702 slides relative to the first device housing 701 between the closed position 300 of FIG. 8 and the open position 200 of FIG. 7.

A rotor 501 is positioned within a curvilinear section 502 of the flexible display 104. The rotor 501 causes a linear translation 710 of the flexible display 104 by moving the flexible display 104 around the rotor 501 when the rotor 501 rotates.

By comparing FIGS. 7 and 8, the movement of the display mover 704 and the housing mover 705 when the first device housing 701 and second device housing 702 transition between the open position 200 and the closed position 300 can be seen. In FIG. 7, the housing mover 705 is to the right of the display mover 704, which has moved to the end of the slider framework 703 so as to be adjacent to the rotor 501.

By contrast, in FIG. 8, the actuator 706 has caused the display mover 704 and the housing mover 705 to slide 707 symmetrically in opposite directions 708,709 along the slider framework 703 when the second device housing 702 slides relative to the first device housing 701 between the closed position 300 of FIG. 8 and the open position 400 of FIG. 7. In this illustrative embodiment, "sliding symmetrically in opposite directions" means that the housing mover 705 and the display mover 704 move at the same rate, and travel the same distance, in the opposite direction 708,709 in response to the action of the actuator 706.

This sliding of the display mover 704 and the housing mover 705 symmetrically in opposite directions performs a number of functions: First, it ensures that the portions of the flexible display 104 situated beneath the rotor 501 do not bunch, crumple, hang, snag, or otherwise become maligned due to the fact that the display mover 704 is drawing one end of the flexible display 104 into the first device housing 701. Second, they ensure that no pillowing occurs due to the fact that the coupling of one end of the flexible display 104 to the display mover 704, and the other end of the flexible display 104 to the second device housing 702, ensures that all slack is removed from the flexible display 104. Third, this symmetrical sliding results in the second device housing 702 moving to the left (in these views) at the same rate, and across the same distance, as the end of the flexible display 104 coupled to the display mover 704 does in the first device housing 701.

In so doing, the mechanical assembly 117 functions as a reverse motion link with sliding-arms defined by the display mover 704 and the housing mover 705 that travel symmetrically in opposite directions 708,709 along the slider framework 703. Said differently, the mechanical assembly 117 defines a reverse motion link comprising the display mover 704 coupled to a second end of the flexible display 104, a housing mover 705 coupled to the second device housing 702, and an actuator 706 causing the second end of the flexible display 104 and the second device housing 702 to travel symmetrically in opposite directions 708,709 relative to the first device housing 701.

Figure 9:
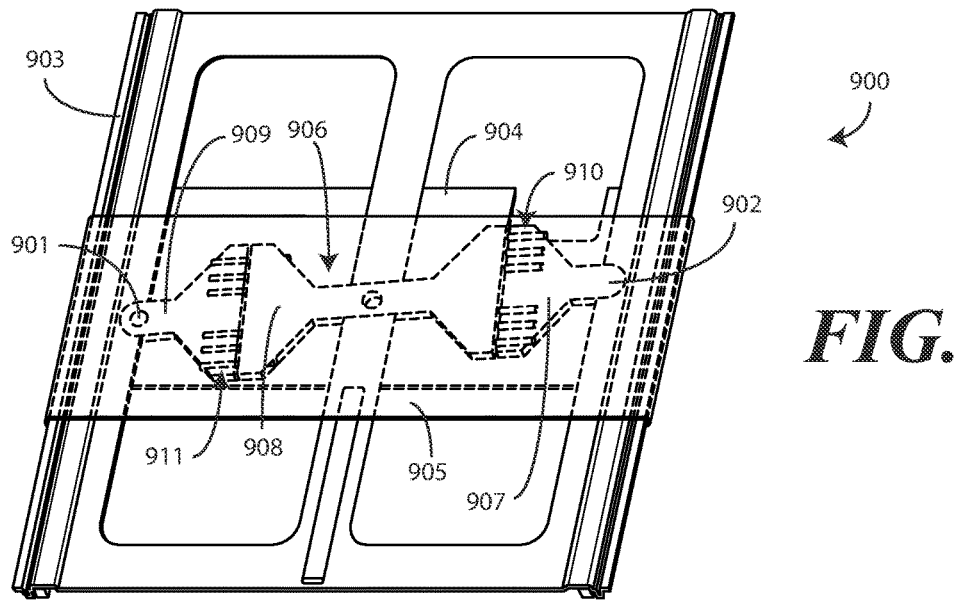
FIG. 9 illustrates one explanatory mechanical mechanism suitable for use in a sliding electronic device in accordance with one or more embodiments of the disclosure.

Turning now to FIG. 9, illustrated therein is one explanatory mechanical assembly defining such a reverse motion link 900 in accordance with one or more embodiments of the disclosure. As shown in FIG. 9, the reverse motion link 900 includes a slider framework 903, a display mover 904, a housing mover 905, and an actuator 906. In this illustrative embodiment the actuator 906 is coupled to the housing mover 905 at a first coupling point 901. The actuator is also coupled to the display mover 904 at a second coupling point 902.

In this illustrative embodiment, the actuator 906 comprises a spring actuator. In particular, the actuator 906 comprises a first pivoting header 907 coupled to the display mover 904, a second pivoting header 909 coupled to the housing mover 905, and a pivoting arm 908 couples to the slider framework 903. In this illustrative embodiment, the first pivoting header 907 and the second pivoting header 909 each define a Y-shape, while the pivoting arm 908 defines a bow-tie shape. In one or more embodiments, the slider framework 903 is manufactured from metal, while the first pivoting header 907 and the second pivoting header 909 are manufactured from plastic. In one or more embodiments, the display mover 904 and housing mover 905 are also manufactured from metal as well. However, these materials can be changed, with the display mover 904 and housing mover 905 also being manufactured from metal, or the slider framework 903 being manufactured from plastic, and so forth.

In this illustrative embodiment, one or more springs 910,911 are positioned between the first pivoting header 907 and the pivoting arm 908, and the second pivoting header 909 and the pivoting arm 908, respectively. In the illustrative embodiment of FIG. 9, the one or more springs 910,911 are compression springs that bias the pivoting arm 908 away from the first pivoting header 907. The one or more springs 910,911 also bias the pivoting arm 908 away from the second pivoting header 909. In so doing, the one or more springs 910,911 of the actuator 906 apply a loading force between the first pivoting header 907 and the pivoting arm 908 and the second pivoting header 909 and the pivoting arm 908, respectively, to bias the display mover 904 away from the housing mover 905 when the electronic device to which the reverse motion link 900 is coupled is in either the open position (200) or the closed position (300). This can be seen by comparing FIGS. 10-12.

Figure 10:
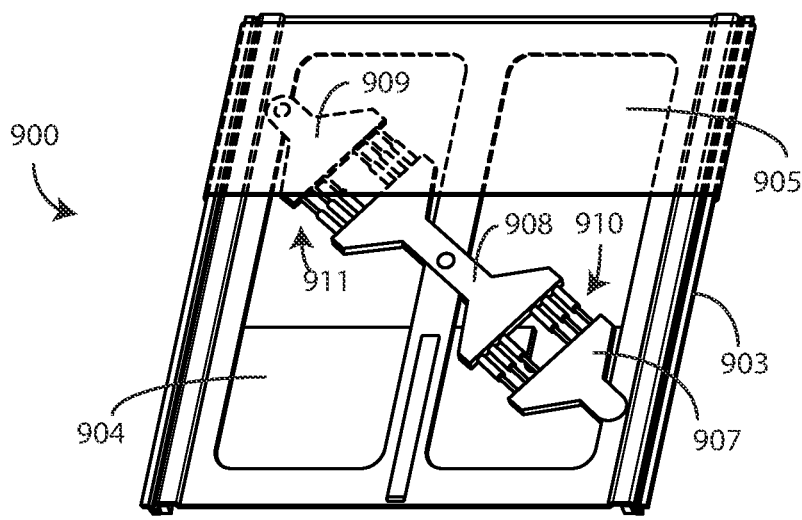
FIG. 10 illustrates the explanatory mechanical mechanism of FIG. 9 as it would appear when the sliding electronic device to which it is coupled is in the closed position.
Figure 11:
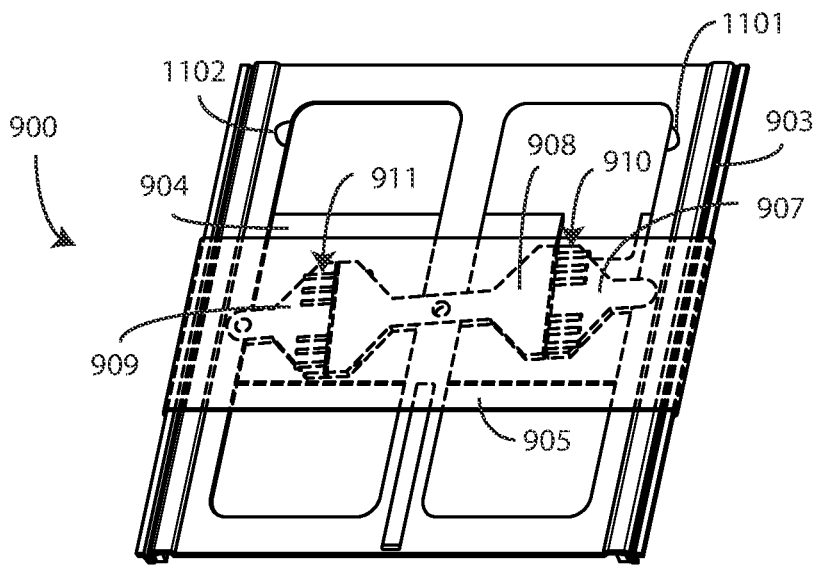
FIG. 11 illustrates the explanatory mechanical mechanism of FIG. 9 as it would appear when the sliding electronic device to which it is coupled is in a partially open position.
Figure 12:
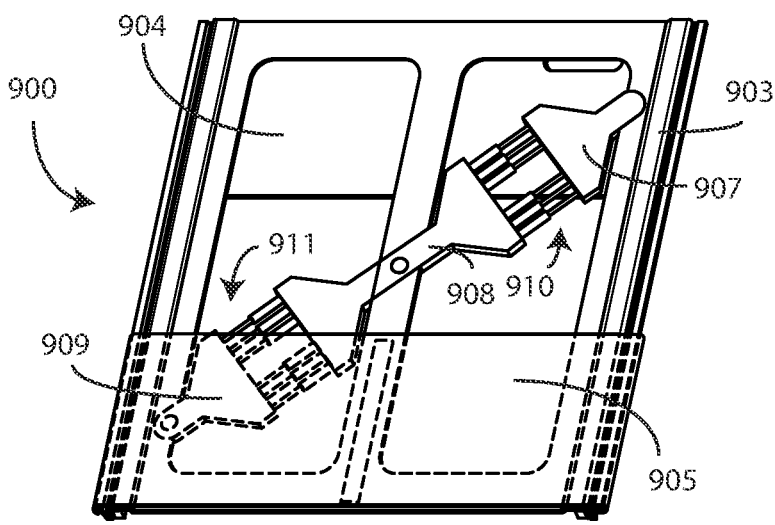
FIG. 12 illustrates the explanatory mechanical mechanism of FIG. 9 as it would appear when the sliding electronic device to which it is coupled is in the open position.

Turning now to these figures, at FIG. 10 the reverse motion link 900 is shown as it would be when coupled to a sliding electronic device with the first device housing and second device housing moved to the open position. By contrast, FIG. 12 illustrates the reverse motion link 900 as it would appear when coupled to a sliding electronic device with the first device housing and second device housing moved to the closed position. FIG. 11 shows the reverse motion link 900 in a position between these two limit positions.

As shown, the display mover 904 and housing mover 905 move to opposite ends of the slider framework 903 when in the open position or closed position. This causes the one or more springs 910,911 bias the pivoting arm 908 away from the first pivoting header 907 and the second pivoting header 909, thereby biasing the display mover 904 away from the housing mover 905 when the electronic device to which the reverse motion link 900 is coupled is in either the open position or the closed position. In FIG. 11, the one or more springs 910,911 become compressed between the first pivoting header 907 and pivoting arm 908 and the second pivoting header 909 and pivoting arm 908, respectively.

In one or more embodiments, a spring detent 1101,1102 can arrest travel of one or more of the housing mover 905 or the display mover 904. As best seen in FIG. 11, in this illustrative embodiment the spring detent 1101,1102 comprises a notch in sides of the slider framework 903 into which a pin extending from the first coupling point 901 between the second pivoting header 909 and the housing mover 905 and another pin extending from the second coupling point 902 between the first pivoting header 907 and the display mover 904 can situate when the reverse motion link 900 is in the open position or closed position, respectively. Other ways of creating spring detents capable of arresting travel of one or both of the housing mover 905 or the display mover 904 will be obvious to those of ordinary skill in the art having the benefit of this disclosure.

Figure 13:
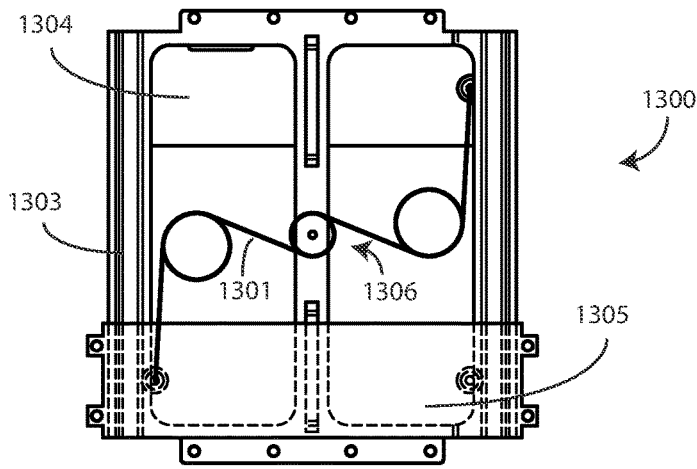
FIG. 13 illustrates an alternate explanatory mechanical mechanism suitable for use in a sliding electronic device in accordance with one or more embodiments of the disclosure.

Turning now to FIG. 13, illustrated therein is an alternate reverse motion link 1300 configured in accordance with one or more embodiments of the disclosure. As before, the reverse motion link 1300 includes a slider framework 1303, a display mover 1304, and a housing mover 1305.

The reverse motion link 1300 of FIG. 13 differs from the reverse motion link (900) of FIGS. 9-12 because it has a different actuator 1306. In the illustrative embodiment of FIG. 13 comprises a spring arm 1301 having a first end coupled to the display mover 1304 and a second end coupled to the housing mover 1305. A central portion of the spring arm 1301 is coupled to the slider framework 1303. In this illustrative embodiment, a first spring loop is situated between the first end of the spring arm 1301 and the central portion. Similarly, a second spring loop is situated between the second end of the spring arm 1301 and the central portion. As before, the actuator biases the display mover 1304 away from the housing mover 1305 when the electronic device to which the reverse motion link 1300 is coupled is in either the closed position or the open position.

Figure 14:
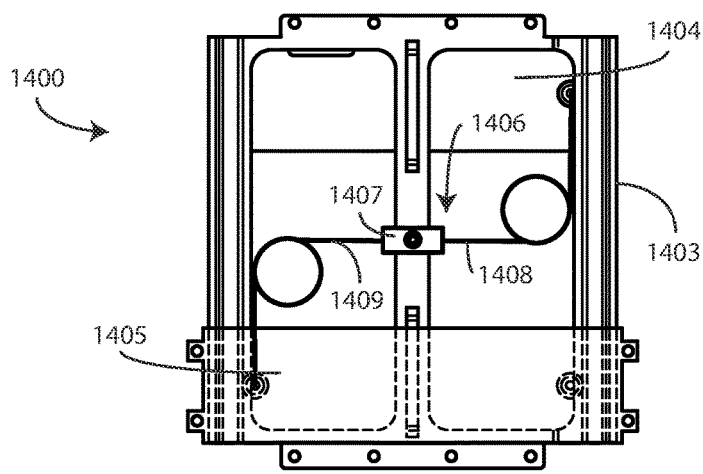
FIG. 14 illustrates still another explanatory mechanical mechanism suitable for use in a sliding electronic device in accordance with one or more embodiments of the disclosure.

Turning now to FIG. 14, illustrated therein is another reverse motion link 1400 configured in accordance with one or more embodiments of the disclosure. As before, the reverse motion link 1400 includes a slider framework 1403, a display mover 1404, and a housing mover 1405.

Once again, the actuator 1406 of this reverse motion link 1400 differs from that of the assemblies previously described. In this illustrative embodiment, a pivoting arm 1407 is coupled to the slider framework 1403. A first spring arm 1408 extends distally from a first side of the pivoting arm 1407 with a first spring arm distal end coupled to the display mover 1404. Similarly, a second spring arm 1409 extends distally from a second side of the pivoting arm 1407 with a second spring arm distal end coupled to the housing mover 1405. As with the embodiment of FIG. 13, a first spring loop is situated between the first end of the pivoting arm 1407 and the first spring arm distal end, while a second spring loop is situated between the second end of pivoting arm 1407 and second spring arm distal end. The actuator 1406 biases the display mover 1404 away from the housing mover 1405 when the electronic device to which the reverse motion link 1400 is coupled is in either the closed position or the open position.

Figure 15:
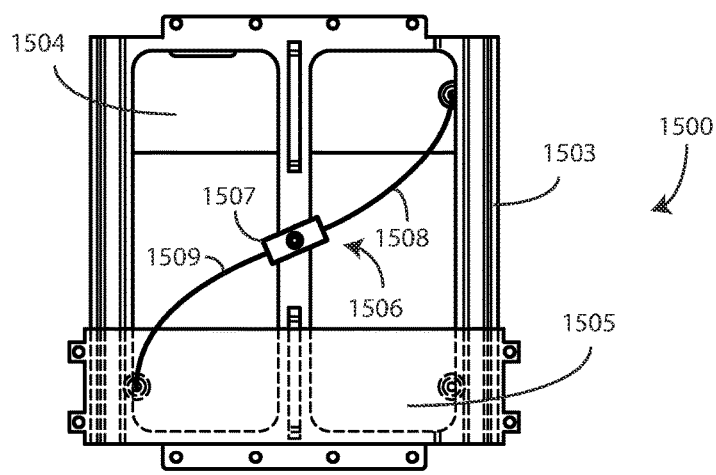
FIG. 15 illustrates yet another explanatory mechanical mechanism suitable for use in a sliding electronic device in accordance with one or more embodiments of the disclosure.

Turning now to FIG. 15, illustrated therein is another reverse motion link 1500 configured in accordance with one or more embodiments of the disclosure. The reverse motion link 1500 once again includes a slider framework 1503, a display mover 1504, and a housing mover 1505.

The actuator 1506 of this reverse motion link 1500 is the same as that of FIG. 14, with the exception that the first spring loop situated between the first end of the pivoting arm 1507 and the first spring arm distal end of the first spring arm 1508 and the second spring loop situated between the second end of pivoting arm 1507 and second spring arm distal end of the second spring arm 1509 are omitted.

Figure 16:
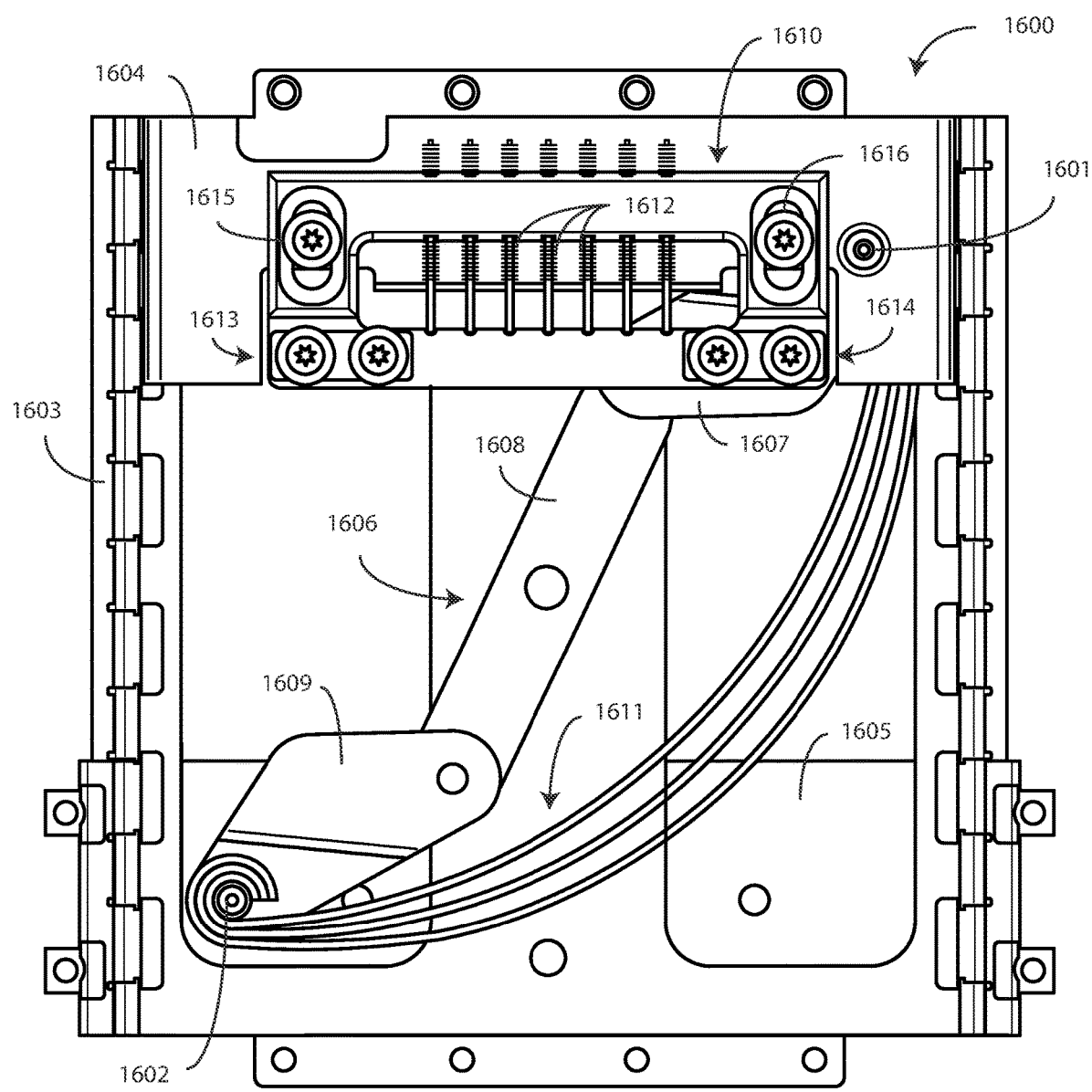
FIG. 16 illustrates another explanatory mechanical mechanism suitable for use in a sliding electronic device in accordance with one or more embodiments of the disclosure.

Turning now to FIG. 16, illustrated therein is still another reverse motion link 1600 configured in accordance with one or more embodiments of the disclosure. While the actuators of previous embodiments were positioned on the housing mover side of the slider framework, in the illustrative embodiment of FIG. 16 the actuator 1606 is positioned on the display mover side of the slider framework 1603. It should be noted that the actuator can be placed on either the housing mover side of the slider framework or the display mover side of the slider framework, with the choice being made based upon design considerations and space limitations within an electronic device. In FIG. 16, the actuator 1606 is positioned on the display mover side of the slider framework 1603 due to the fact that the reverse motion link 1600 also includes a tensioner 1610.

As before, the reverse motion link 1600 includes a slider framework 1603, a display mover 1604, a housing mover 1605, and an actuator 1606. The display mover 1604 is slidably coupled to the slider framework 1603, as is the housing mover 1605. The actuator 1606 is coupled between the display mover 1604 and the housing mover 1605 and is operable to cause the display mover 1604 and the housing mover 1605 to slide symmetrically in opposite directions along the slider framework 1603 when a second device housing coupled to the housing mover 1605 slides relative to another second device housing to which the slider framework 1603 is coupled between an open position and a closed position.

In this illustrative embodiment, the actuator 1606 is again a spring actuator. The actuator 1606 comprises a first pivoting header 1607 coupled to the display mover 1604 at a first pivot point 1601. The actuator 1606 also comprises a second pivoting header 1609 coupled to the housing mover 1605 at a second pivot point 1602.

In this illustrative embodiment, a pivoting arm 1608 is then pivotally coupled to a central beam of the slider framework 1603 bounded on either side by apertures that pass through the slider framework 1603. The pivoting arm 1608 comprises a first end that is pivotally coupled to the first pivoting header 1607 and a second end that is pivotally coupled to the second pivoting header 1609.

One or more leaf springs 1611 then are coupled between the first pivot point 1601 and the second pivot point 1602. In this illustrative embodiment, the one or more leaf springs 1611 comprise three leaf springs, although more or fewer leaf springs can be used in other embodiments. In one or more embodiments, the one or more leaf springs 1611 are coupled to the display mover 1604 on a first side of the reverse motion link 1600 (the right side in FIG. 16) and are coupled to the housing mover 1605 on a second side of the reverse motion link 1600 (the left side in FIG. 16).

When the housing mover 1605 and display mover 1604 pass each other (which would occur when the housing mover 1605 moves up and the display mover 1604 moves down from the positions shown in FIG. 16), the one or more leaf springs 1611 compress. However, when the display mover 1604 and housing mover 1605 are situated at the top and bottom of the slider framework 1603, or vice versa, which would correspond to positions when an electronic device to which the reverse motion link 1600 is coupled is in an open position or a closed position, the one or more leaf springs 1611 expand to bias the display mover 1604 away from the housing mover 1605. Thus, when the electronic device to which the reverse motion link 1600 is coupled is in the open position or the closed position, the one or more leaf springs 1611 apply a loading force to bias the display mover 1604 away from the housing mover 1605. As noted above, one or more spring detents can be added to the reverse motion link 1600 to arrest the travel of one or both of the display mover 1604 or the housing mover 1605.

The reverse motion link 1600 of FIG. 16 differs from other mechanical assemblies above because it includes a tensioner 1610. While the tensioner 1610 is shown initially in FIG. 16, it should be noted that any of the embodiments of FIGS. 1-15 could also include a tensioner. The tensioner was omitted from the views of FIGS. 9-15, for example, for simplicity and to show the operation of the various actuators as they cause the display movers and housing movers to slide symmetrically in opposite directions. However, any of these embodiments could include a tensioner as well.

In this illustrative embodiment, the tensioner 1610 is coupled to the display mover 1604 and is configured to couple an end of the flexible display to the display mover 1604. Said differently, when a flexible display is attached to the reverse motion link 1600 of FIG. 16, the tensioner is coupled between the display mover 1604 and the flexible display.

In this illustrative embodiment, the tensioner 1610 comprises one or more springs 1612 that apply a loading force biasing an end of the flexible display toward an end of the slider framework 1603. When the slider framework 1603 is coupled to an electronic device as shown above if FIGS. 7-8, this causes the one or more springs 1612 to bias an end of the flexible display toward an end of the device housing to which the slider framework 1603 is coupled.

The inclusion of the tensioner 1610 offers several advantages. First, it allows for increased mechanical tolerances of the various parts and components. Recall from above that one of the goals of including the reverse motion link 1600 is to prevent pillowing and bunching of the flexible display. To keep the flexible display perfectly flat, the distance from the second device housing to which first end of the flexible display is coupled, around the rotor, and to the display mover 1604 must precisely match the length of the flexible display. By including a tensioner, which has screws 1613, 1614 to attach to the second end of the flexible display, the one or more springs 1612 can apply a loading force allowing mechanical tolerances to be laxer while still keeping the flexible display flat. Moreover, in the illustrative embodiment of FIG. 16 the tensioner includes adjustment lugs 1615,1616 that allow the position of the tensioner 1610 to be moved up or down along the display mover 1604, thereby allowing for each electronic device to be customized even when the length of the flexible displays encountered during manufacturing differs slightly.

Second, and more importantly, the one or more springs 1612 of the tensioner 1610 apply a loading force that keeps the flexible display flat. When users are delivering touch input to the flexible display, this keeps the flexible display from bouncing up and down or moving due to the fact that pillowing is eliminated.

Third, and most importantly, the inclusion of the tensioner ensures that there is no bunching, gathering, snagging, or other deleterious actions that occur when the first device housing and second device housing of the electronic device to which the reverse motion link 1600 is coupled slide from the open position to the closed position. Said differently, when the end of the flexible display to which the tensioner 1610 is coupled moves into the first device housing to which the slider framework 1603 is coupled, the tensioner helps to ensure that this portion of the flexible display is flat and smoothly slides into the device housing. In effect, since the curvilinear section of the flexible display passes around the rotor, the tensioner biases an end of the flexible display away from the rotor, which helps to ensure that the lower portion of the J-shape stays flat as the first device housing and second device housing move from the open position to the closed position.

Figure 17:
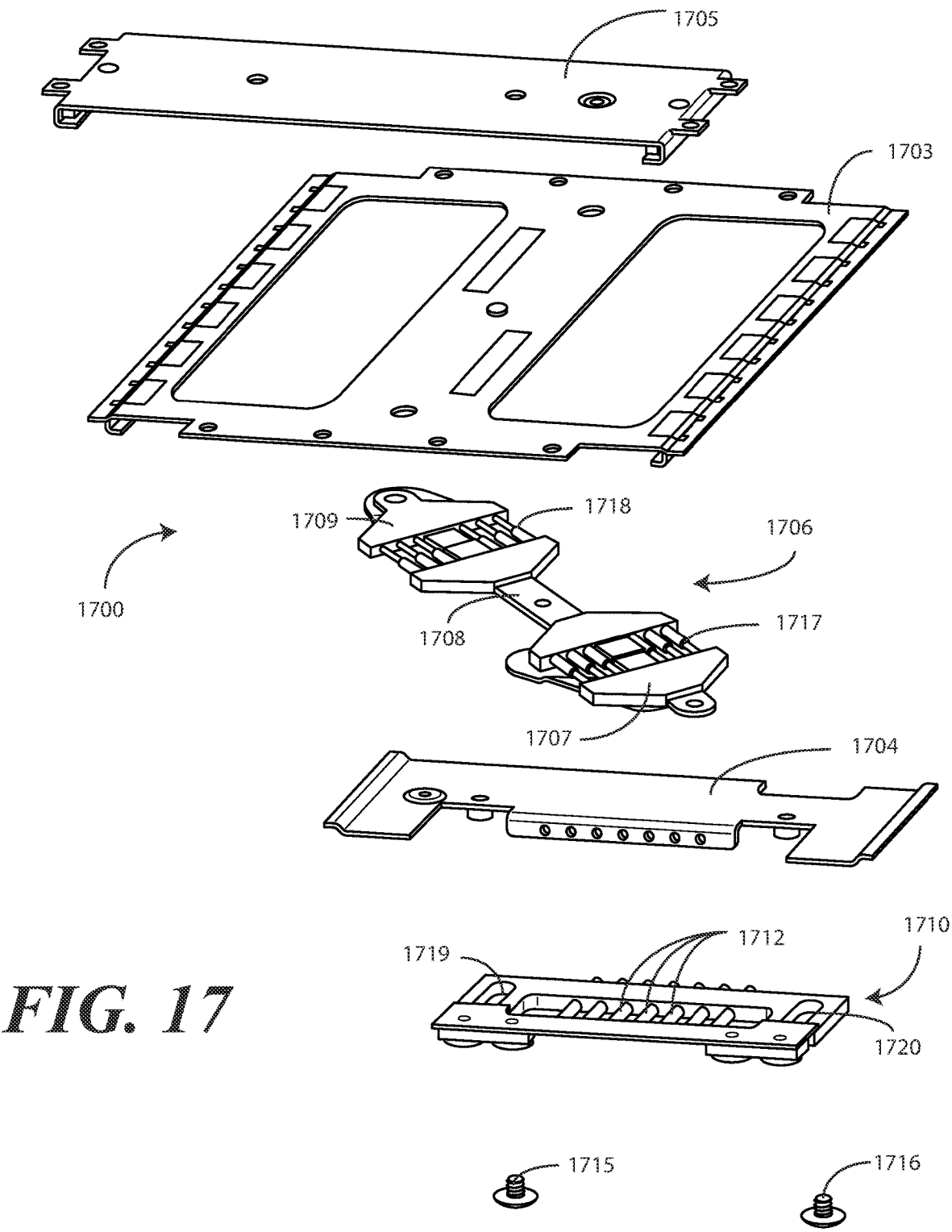
FIG. 17 illustrates an exploded view of one explanatory mechanical mechanism suitable for use in a sliding electronic device in accordance with one or more embodiments of the disclosure.

Turning now to FIG. 17, illustrated therein is an exploded view of another reverse motion link 1700 configured in accordance with one or more embodiments of the disclosure so that the parts can more clearly be seen. As before, the reverse motion link 1700 includes a display mover 1704 that slidably coupled to a slider framework 1703. A housing mover 1705 is also slidably coupled to the slider framework 1703.

The actuator 1706 of FIG. 17 is similar to that of FIGS. 9-12 and includes a first pivoting header 1707 that couples to the display mover 1704, a second pivoting header 1709 that couples to the housing mover 1705, and a pivoting arm 1708 that pivotally couples to the slider framework 1703. In this illustrative embodiment, the first pivoting header 1707 and the second pivoting header 1709 each define a Y-shape, while the pivoting arm 1708 defines a bow-tie shape.

One or more springs 1717,1718 are positioned between the first pivoting header 1707 and the pivoting arm 1708, and the second pivoting header 1709 and the pivoting arm 1708, respectively. In the illustrative embodiment of FIG. 17, the one or more springs 1717,1718 are compression springs that bias the pivoting arm 1708 away from the first pivoting header 1707 and away from the second pivoting header 1709. In so doing, the one or more springs 1717,1718 of the actuator 1706 apply a loading force between the first pivoting header 1707 and the pivoting arm 1708 and the second pivoting header 1709 and the pivoting arm 1708, respectively, to bias the display mover 1704 away from the housing mover 1705 when the electronic device to which the reverse motion link 1700 is coupled is in either the open position (200) or the closed position (300).

A pair of screws 1715,1716 couple the tensioner 1710, which also includes one or more springs 1712 to apply a loading force to draw an end of a flexible display toward the display mover 1704, to the display mover 1704. The apertures 1719,1720 through which the screws 1715,1716 pass is longer along at least one axis so as the location at which the tensioner 1710 is attached to the display mover 1704 to be adjusted as previously described.

Figure 18:
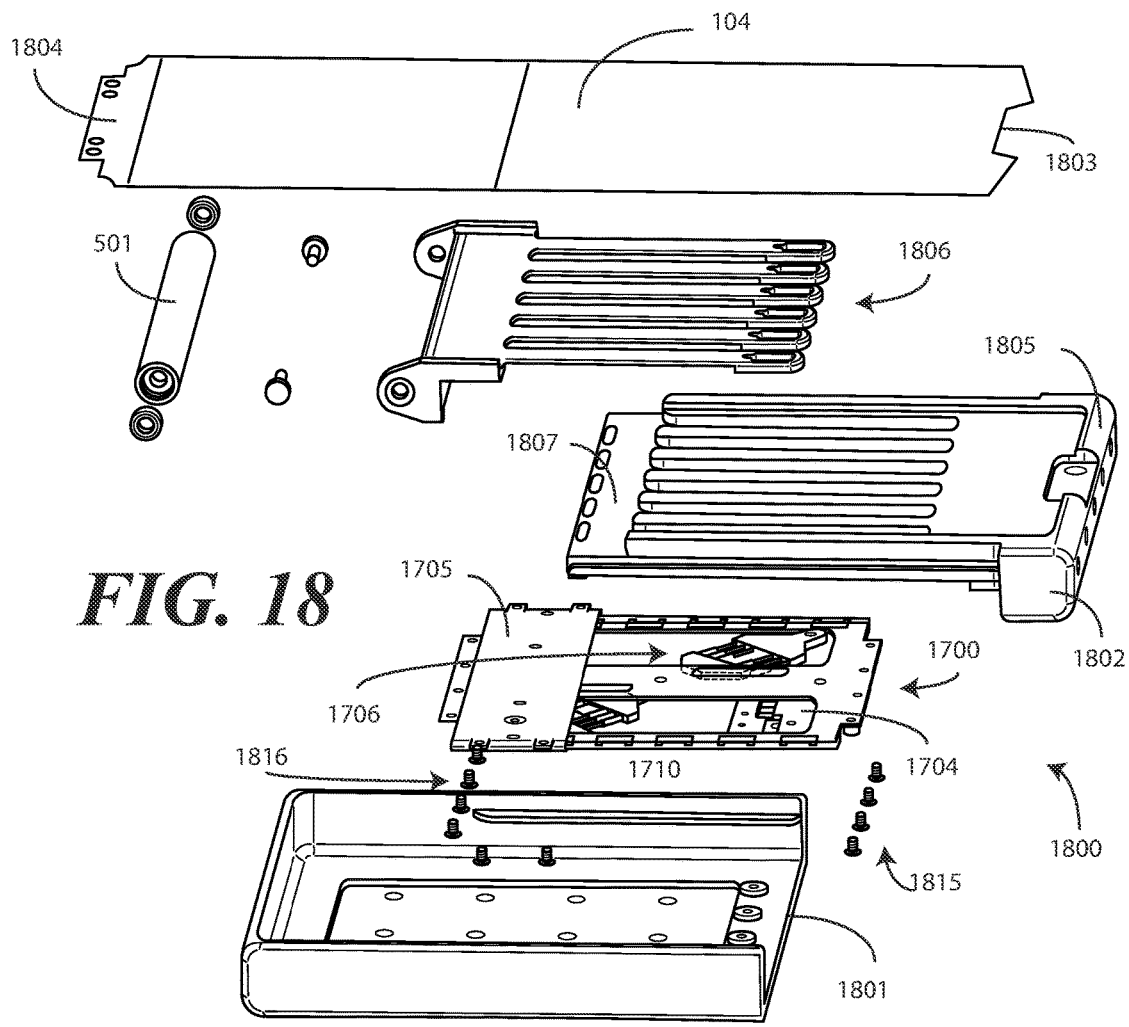
FIG. 18 illustrates an exploded view of one explanatory sliding electronic device in accordance with one or more embodiments of the disclosure.

Turning now to FIG. 18, illustrated therein is an exploded view of one explanatory electronic device 1800 configured in accordance with one or more embodiments of the disclosure. The electronic device 1800 includes a first device housing 1801 and a second device housing 1802, the assembled reverse motion link 1700 of FIG. 17, a flexible display 104, and a rotor 501. The reverse motion link 1700 gets fixedly coupled to the first device housing 1801.

As described above, the reverse motion link 1700 includes a display mover 1704, a housing mover 1705, an actuator 1706, and a tensioner 1710. One or more screws 1816 couple the housing mover 1705 to the second device housing 1802.

The flexible display 104 comprises a first end 1803 and a second end 1804. The first end 1803 of the first device housing 102 gets coupled to a first end 1805 of the second device housing 1802. One or more other screws 1815 couple the second end 1804 of the flexible display 104 to the tensioner 1710, which is thus coupled between the display mover 1704 and the second end 1804 of the flexible display 104.

The flexible display 104 wraps around the rotor 501. The rotor 501 is attached to a mechanical support layer 1806 positioned between a first portion of the flexible display 104 and a translation surface 1807 defined by the second device housing 1802. The mechanical support layer 1806 is affixed to the first device housing 1801 in one or more embodiments. The mechanical support layer 1806 defines a plurality of fingers and is slidably coupled to the second device housing 1802 so that it can provide a support surface between the first portion of the flexible display 104 when the first device housing 1801 and second device housing 1802 slide relative to each other.

When assembled, the rotor 501 is positioned within a curvilinear section of the flexible display 104 between the first end 1805 of the second device housing 1802 and the tensioner 1710. The rotor 501 and the support layer 1806 translate linearly away from the second device housing 1802 when the electronic device 1800 slides to the open position.

In one or more embodiments, the support layer 1806 comprises a rigid part with a plurality of fingers that provide a substantially planar support for the flexible display 104. Illustrating by example, the support layer 1806 can be manufactured from a rigid thermoplastic or stainless steel in one or more embodiments. Other rigid materials suitable for manufacturing the support layer 1806 will be obvious to those of ordinary skill in the art having the benefit of this disclosure.

When the flexible display 104 is coupled to the second device housing 1802 and the tensioner 1710, a curvilinear section of the flexible display 104 engages the rotor 501. When the first device housing 1801 and second device housing 1802 slide relative to each other, the flexible display 104 wraps around the rotor 501 such that the first end 1803 of the flexible display 104 extends further from the rotor 501 when the electronic device 1800 is in the open position. Similarly, the second end 1804 of the flexible display 104 extends further from the rotor 501 when the electronic device 1800 is in the closed position.

In one or more embodiments, a cross section of the flexible display 104 defines a J-shape with a curved portion of the J-shape wrapped around the rotor 501 and an upper portion of the J-shape passing across a translation surface of the electronic device 1800 defined by the support layer 1806 and the second device housing 1802, which has corresponding grooves into which the fingers of the support layer 1806 slide when the electronic device 1800 is in the closed position. When the electronic device 1800 opens, the upper portion of the J-shape becomes longer as the flexible display 104 wraps around the rotor and extends further out of the first device housing 1801. When the electronic device 1800 closes, the upper portion of the J-shape becomes shorter as the reverse operation occurs. Thus, when the first device housing 1801 translates relative to the second device housing 1802, the flexible display 104 deforms at different locations as it wraps and passes around the rotor 501.

Figure 19:
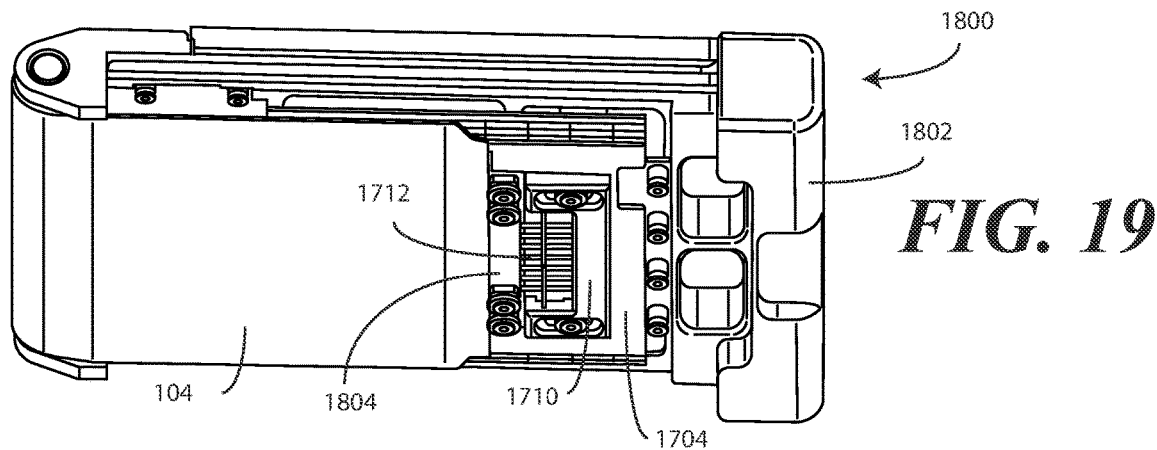
FIG. 19 illustrates a cut-away view of one explanatory sliding electronic device in accordance with one or more embodiments of the disclosure.

The assembled electronic device 1800 is shown in FIG. 19. The electronic device 1800 includes the first device housing (1801), which is not shown in FIG. 19 but which is slidably coupled to the second device housing 1802. The flexible display 104 has a first end (1803) coupled to the second device housing 1802 and a second end 1804 coupled to the display mover 1704 by the tensioner 1710. The housing mover (1705) is coupled to the second device housing 1802. The actuator (1706) of the reverse motion link 1700 causes the second end 1804 of the flexible display 104 and the second device housing 1802 to travel symmetrically in opposite directions relative to the first device housing 1801.

As previously described, the tensioner 1710 comprises a plurality of springs 1712 coupled between the second end (1804) of the flexible display 104 and the display mover 1704. This plurality of springs 1712 apply a loading force biasing the second end 1804 of the flexible display 104 toward the display mover 1704. Said differently, the tensioner 1710 applies a loading force to remove slack from the flexible display 104 as the flexible display 104 passes around the rotor (501).

To this point, the actuators described in conjunction with the mechanical assemblies and reverse motion links described above have all been spring actuators. However, embodiments of the disclosure contemplate that other types of actuators can be used as well. For instance, when a spring actuator is used, manual force must be applied to open or close a sliding electronic device. While the spring actuator includes springs that apply a loading force to bias the electronic device toward either the closed or open positions, a person must apply a force to transition the electronic device between these states since a compressing force must be applied to the spring actuator for the device housings to move.

In other embodiments, a user may prefer the sliding action to be automatic rather than manual. Accordingly, an embodiment facilitating this automatic sliding action is shown in FIG. 20.

Figure 20:
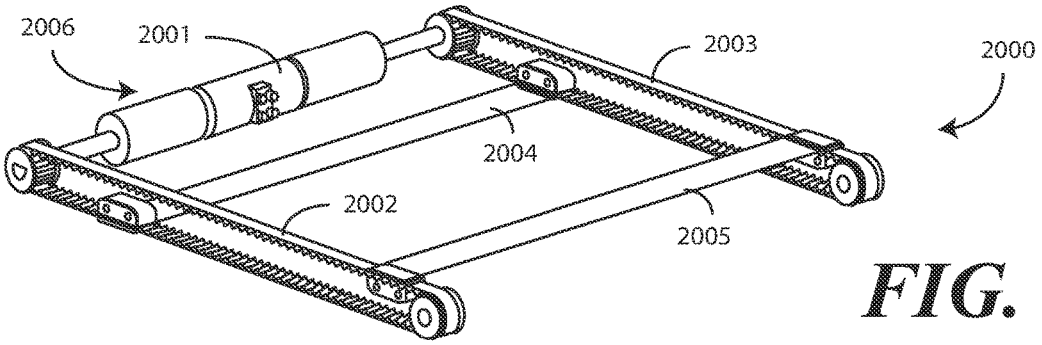
FIG. 20 illustrates another explanatory mechanical mechanism suitable for use in a sliding electronic device in accordance with one or more embodiments of the disclosure.

Turning now to FIG. 20, in this reverse motion link 2000 the actuator 2006 comprises a dual shaft motor 2001 coupled to at least one timing belt. In the illustrative embodiment of FIG. 20, the single dual shaft motor is coupled to, and capable of driving, a first timing belt 2002 and a second timing belt 2003. In other embodiments, the single dual shaft motor could be replaced by two motors, with one driving the first timing belt 2002 and another driving the second timing belt 2003. In some embodiments, due to the required torque and size constraints associated with where the motors are positioned two motors will be preferable. When using two motors, of course care would need to be taken to synchronize the operation of the motors so that the first timing belt 2002 and the second timing belt 2003 move in synchrony.

A housing mover 2005 is coupled to an upper band of each of the first timing belt 2002 and the second timing belt 2003, while a display mover 2004 is coupled to a lower band of each of the first timing belt 2002 and the second timing belt 2003. When the dual shaft motor 2001 is actuated, the upper band and the lower band of each of the first timing belt 2002 and the second timing belt 2003 move in opposite directions, thereby causing the display mover 2004 and the housing mover 2005 to move symmetrically in opposite directions whenever the at least one timing belt to which they are coupled is actuated.

Figure 21:
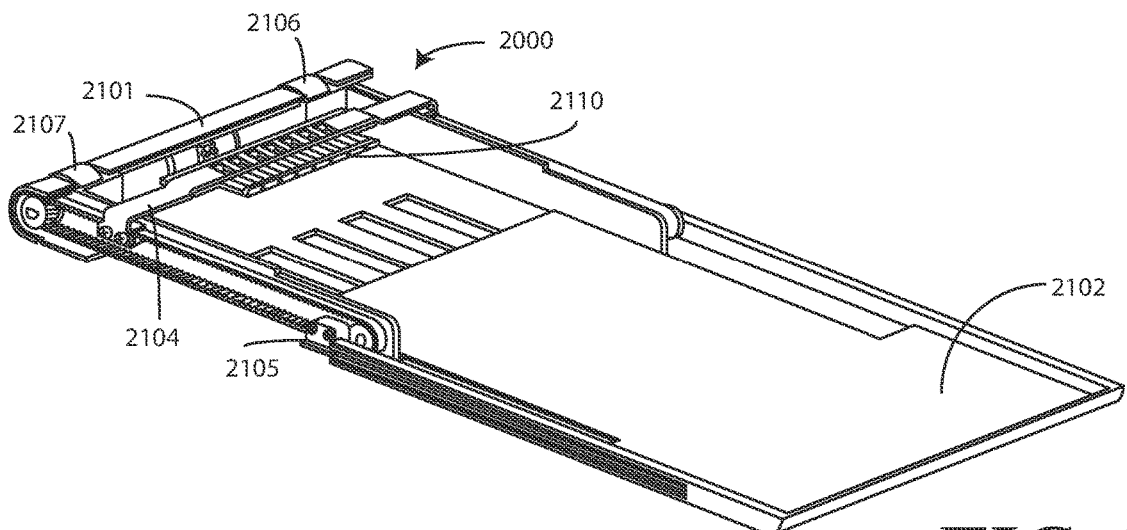
FIG. 21 illustrates the explanatory mechanical mechanism of FIG. 20 coupled to a housing assembly of a sliding electronic device in accordance with one or more embodiments of the disclosure.

Turning now to FIG. 21, the reverse motion link 2000 of FIG. 20 has been coupled to a second device housing 2102. A tensioner 2110 has been coupled to the display mover 2104 and the housing mover 2105 has been coupled to the second device housing 2102. The first device housing has been omitted so that the other parts can more clearly be seen.

A sleeve chassis 2101 has been placed around the dual shaft motor 2001 coupled to the two small rotors 2106,2107 of this assembly so that a flexible display (104), when coupled between the second device housing 2102 and the tensioner 2110, can slide along the sleeve chassis 2101 when the dual shaft motor 2001 is actuated. As before, the reverse motion link 2000 causes the display mover 2004 coupled to the second end (1804) of a flexible display (104) and a housing mover 2005 coupled to the second device housing 2102 to travel symmetrically in opposite directions, while the tensioner 2110 coupled between the second end (1804) of the flexible display (104) and the display mover 2004 applies a loading force to remove slack from the flexible display (104) in portions of the flexible display (104) passing along the sleeve chassis 2101.

Figure 22:
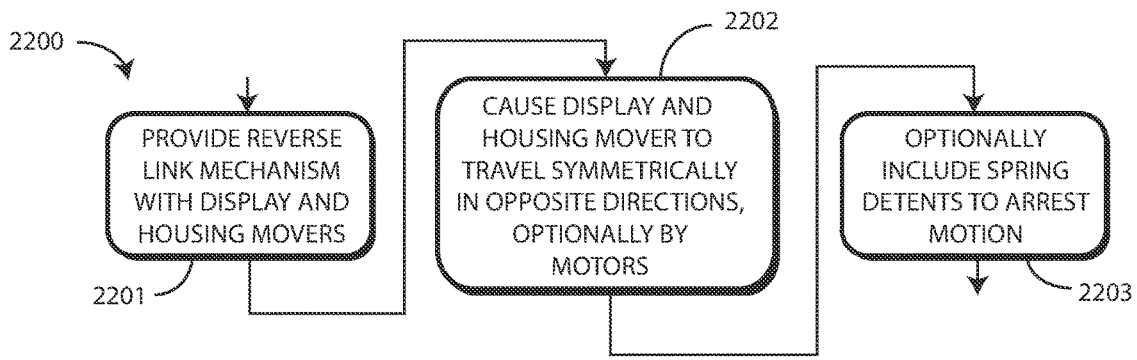
FIG. 22 illustrates one explanatory method in accordance with one or more embodiments of the disclosure.

Method steps that occur with one, a plurality, or all of the reverse motion links described herein are illustrated in FIG. 22. Turning now to FIG. 22, at step 2201 a method 2200 comprises providing a reverse motion link that includes a housing mover, a display mover, and an actuator causing the display mover and the housing mover to move symmetrically in opposite directions in an electronic device.

Step 2202 then comprises causing the display mover and the housing mover to travel symmetrically in opposite directions when a first device housing to which a slider framework of the reverse motion link is coupled and a second device housing to which an end of the flexible display is coupled slide between an open position and a closed position. This step 2202 can be performed in a variety of ways, including my using a spring actuator, a dual-axis motor, and so forth. Other actuators will be described below with reference to FIGS. 25-26. Still others will be obvious to those of ordinary skill in the art having the benefit of this disclosure.

Step 2203 optionally includes providing one or more spring detents to arrest the travel of motion of one or more of the display mover or housing mover.

Figure 23:
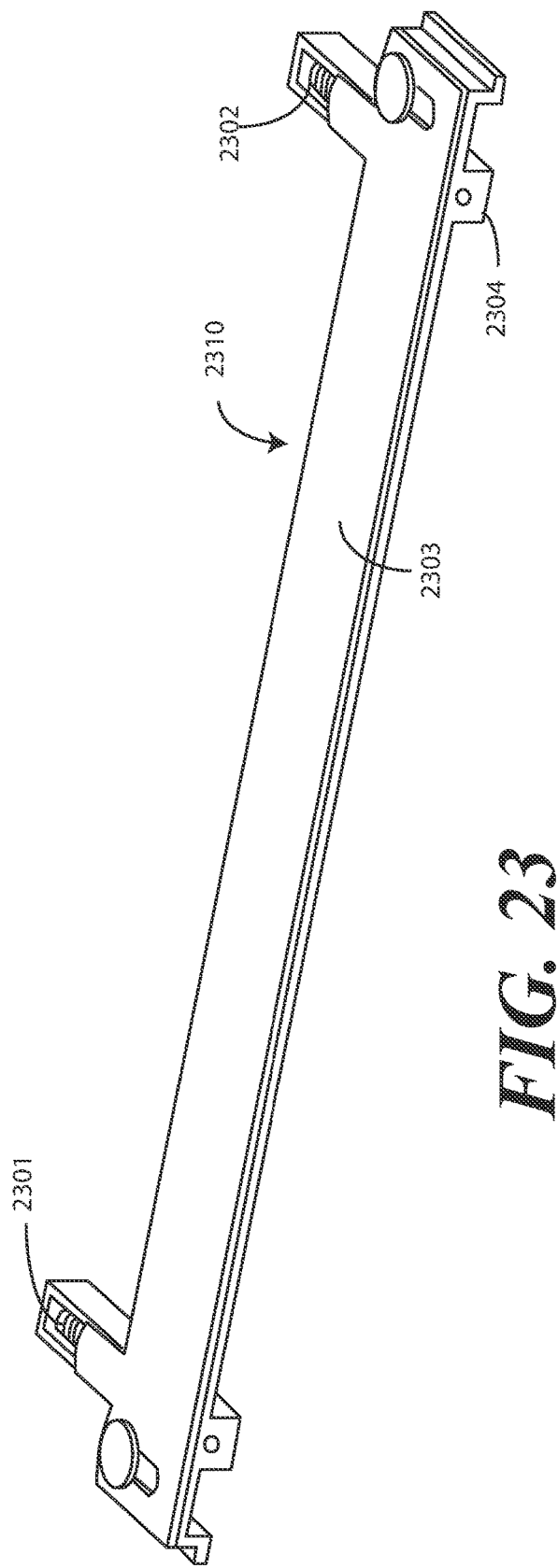
FIG. 23 illustrates one explanatory tensioner in accordance with one or more embodiments of the disclosure.
Figure 24:
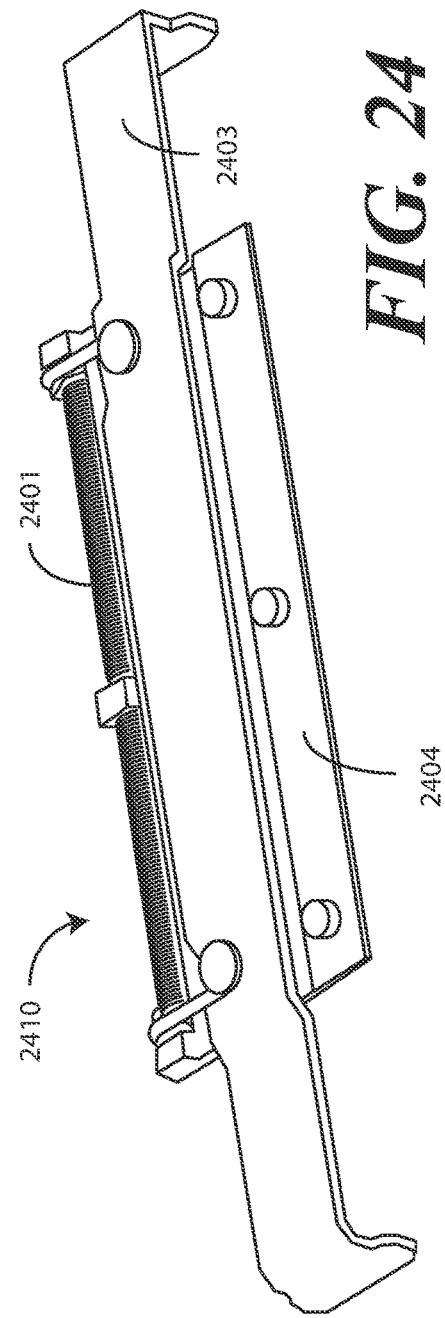
FIG. 24 illustrates another explanatory tensioner in accordance with one or more embodiments of the disclosure.

Turning now to FIGS. 23-24, illustrated therein are two optional tensioners 2310,2410 configured in accordance with one or more embodiments of the disclosure. While the tensioners described above included a plurality of centrally disposed, linear springs, each tensioner 2310,2410 of FIGS. 23-24 is a bit different. Illustrating by example, the tensioner 2310 of FIG. 23 includes two exterior springs 2301,2302 that bias a flexible display coupling plate 2303 away from a tensioner base 2304. The tensioner base 2304 can be coupled to a display mover, while the flexible display coupling plate 2303 is coupled to the flexible display with the two exterior springs 2301,2302 applying a loading force to remove slack from the flexible display.

By contrast, the tensioner 2410 of FIG. 24 includes a coiled spring 2401 with extension members that couple to the flexible display coupling plate 2403. The extension members of the coiled spring 2401 extend outward as the flexible display coupling plate 2403 moves relative to the tensioner base 2404. Since the coiled spring 2401 applies a biasing force drawing the extension members into the coiled spring 2401, the coiled spring 2401 applies a loading force to remove slack from a flexible display coupled thereto.

Figure 25:
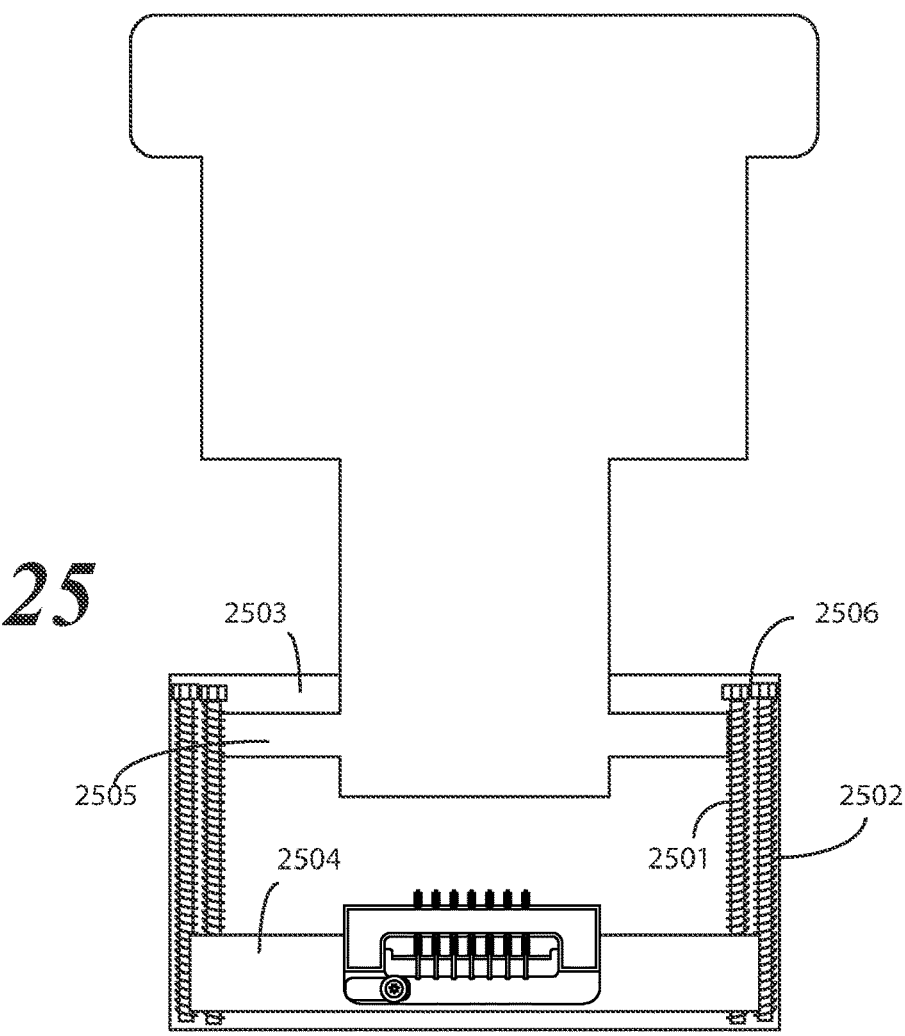
FIG. 25 illustrates another explanatory mechanical mechanism suitable for use in a sliding electronic device in accordance with one or more embodiments of the disclosure.
Figure 26:
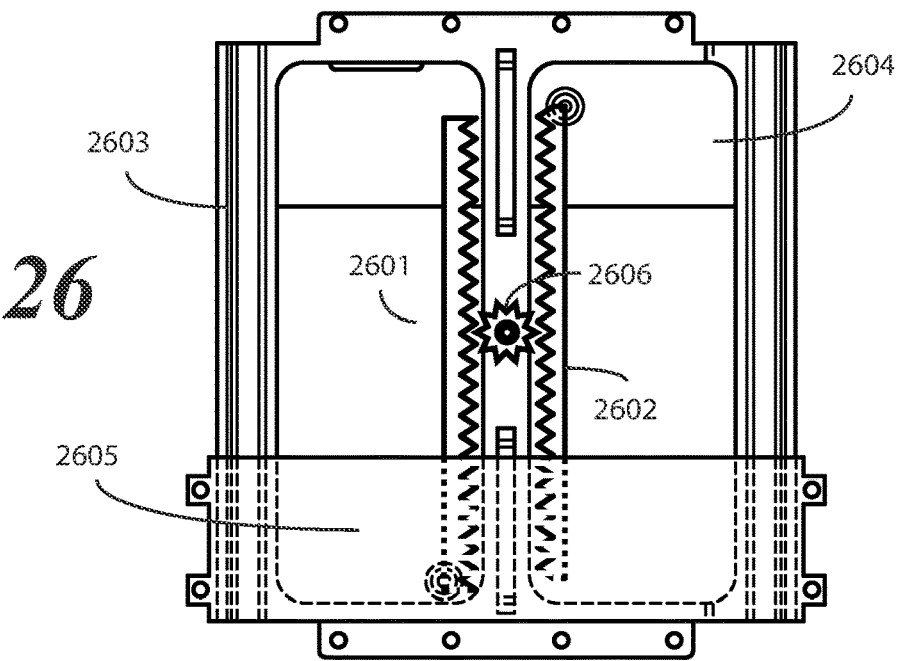
FIG. 26 illustrates still another explanatory mechanical mechanism suitable for use in a sliding electronic device in accordance with one or more embodiments of the disclosure.

Just as there can be different types of tensioners, there can also be different types of actuators. Two have already been described and include a spring actuator and a dual-axis motor. Turning now to FIGS. 25-26, illustrated therein are two additional actuators that can be used with any of the embodiments of the disclosure described above.

Beginning with FIG. 25, this actuator includes a first drive screw 2501 and a second drive screw 2502 positioned on a first side of the actuator framework 2503. A complementary third drive screw and a fourth drive screw are positioned on a second side of the actuator framework 2503 for balance in this illustrating by example, although the actuator could include just two drive screws. For instance, the first drive screw 2501 and the second drive screw 2502 could be centrally positioned within the actuator framework 2503, thereby eliminating the need for the third drive screw and the fourth drive screw.

While not shown for simplicity, in practice a first motor (which may be similar to the motor 2001 of FIG. 20) would be used to turn the first drive screw 2501. In one or more embodiments, such a motor could be positioned at the base of the first drive screw 2501 or above the gear assembly 2506. Similarly, a second motor would be used to turn the corresponding drive screw mirrored on the left side of the figure. As with FIG. 21 above, the two motors should be synchronized to ensure the pairs of drive screws on either side of the device turn in synchrony.

In this illustrative embodiment, a display mover 2504 is coupled to the first drive screw 2501, while a housing mover 2505 is coupled to the second drive screw 2502. A gear assembly 2506 couples the first drive screw 2501 and the second drive screw 2502 such that when one turns in one direction, the other turns in the opposite direction. Thus, when the first drive screw 2501 turns clockwise, the second drive screw 2502 turns counterclockwise, and so forth, due to the action of the gear assembly 2506.

Accordingly, as illustrated in FIG. 25, the actuator comprises the first drive screw 2501, the second drive screw 2502, and the gear assembly 2506 coupled between the first drive screw 2501 and the second drive screw 2502. The display mover 2504 is coupled to the first drive screw 2501, while the housing mover 2505 is coupled to the second drive screw 2502. The display mover 2504 and the housing mover 2505 move symmetrically in opposite directions when the first drive screw 2501 and the second drive screw 2502 rotate.

Turning now to FIG. 26, in this embodiment the actuator comprises a first rack 2601 coupled to the display mover 2604 and a second rack 2602 coupled to the housing mover 2605. A pinion 2606, which is pivotally coupled to the actuator framework 2603, engages the first rack 2601 and the second rack 2602. Rotation of the pinion 2606 causes the display mover 2604 and the housing mover 2505 to travel symmetrically in opposite directions.

It should be noted that the drive screws and rack and pinion are just examples of alternate actuators that can be used in conjunction with a display mover and a housing mover to cause the display mover and housing mover to travel symmetrically in opposite directions to ensure that extension of a flexible display in a sliding electronic device occurs at the same rate and along the same distance as does displacement between a first device housing and a second device housing when the first device housing and second device housing translate between an open position and a closed position. However, numerous others will be obvious to those of ordinary skill in the art having the benefit of this disclosure.

Figure 27:
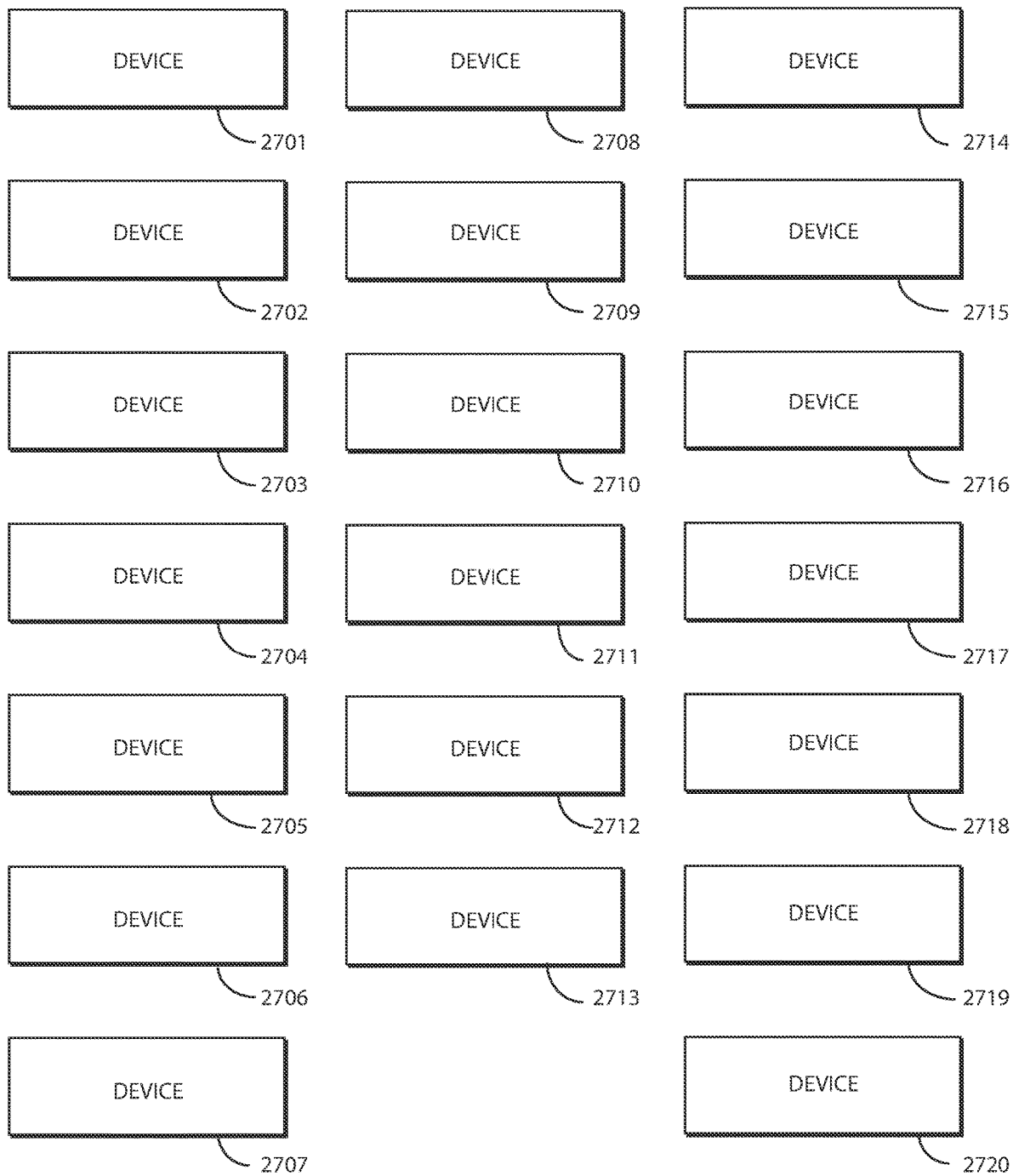
FIG. 27 illustrates various embodiments of the disclosure.

Turning now to FIG. 27, illustrated therein are various embodiments of the disclosure. The embodiments of FIG. 27 are shown as labeled boxes in FIG. 27 due to the fact that the individual components of these embodiments have been illustrated in detail in FIGS. 1-26, which precede FIG. 27. Accordingly, since these items have previously been illustrated and described, their repeated illustration is no longer essential for a proper understanding of these embodiments. Thus, the embodiments are shown as labeled boxes.

Beginning at 2701, an electronic device comprises a first device housing slidably and a second device housing that is slidable relative to the first device housing. At 2701, the electronic device comprises a flexible display and a slider framework fixedly coupled to the first device housing.

At 2701, the electronic device comprises a display mover slidably coupling the flexible display to the slider framework and a housing mover slidably coupling the second device housing to the slider framework. At 2701, the electronic device comprises an actuator coupled between the display mover and the housing mover. At 2701, the actuator causes the display mover and the housing mover to slide symmetrically in opposite directions along the slider framework when the second device housing slides relative to the first device housing between a closed position and an open position.

At 2702, the actuator of 2701 comprises a spring actuator. At 2703, the spring actuator of 2702 biases the display mover away from the housing mover when the electronic device is in either the closed position or the open position.

At 2704, the spring actuator of 2703 comprises a first pivoting header coupled to the display mover and a second pivoting header coupled to the housing mover. At 2704 the spring actuator comprises a pivoting arm coupled to the slider framework.

At 2704, the spring actuator comprises one or more springs biasing the pivoting arm away from the first pivoting header. At 2704, the spring actuator comprises one or more other springs biasing the pivoting arm away from the second pivoting header.

At 2705, the spring actuator of 2703 comprises a spring arm having a first end coupled to the display mover, a second end coupled to the housing mover, and a central portion coupled to the slider framework. At 2706, the spring actuator of 2703 comprises a pivoting arm coupled to the slider framework, a first spring arm extending distally from a first side of the pivoting arm with a first spring arm distal end coupled to the display mover, and a second spring arm extending distally from a second side of the pivoting arm with a second spring arm distal end coupled to the housing mover.

At 2707, the spring actuator of 2703 comprises a first pivoting header coupled to the display mover at a first pivot point and a second pivoting header coupled to the housing mover at a second pivot point. At 2707, the spring actuator comprises a pivoting arm comprising a first end pivotally coupled to the first pivoting header, a second end pivotally coupled to the second pivoting header, and a central section pivotally coupled to the slider framework. At 2707, the spring actuator comprises one or more leaf springs coupled between the first pivot point and the second pivot point.

At 2708, the electronic device of 2703 further comprises a tensioner coupled between the display mover and the flexible display. At 2709, the tensioner of 2708 comprises one or more springs applying a loading force biasing an end of the flexible display toward an end of the first device housing.

At 2710, the electronic device of 2708 further comprises a rotor positioned within a curvilinear section of the flexible display. At 2710, the tensioner biases an end of the flexible display away from the rotor.

At 2711, the electronic device of 2709 further comprises a spring detent arresting travel of one of the housing mover or the display mover.

At 2712, an electronic device comprises a first device housing slidably coupled to a second device housing. At 2712, the electronic device comprises a flexible display comprising a first end coupled to the second device housing and a second end.

At 2712, the electronic device comprises a reverse motion link comprising a display mover coupled to the second end of the flexible display, a housing mover coupled to the second device housing, and an actuator causing the second end of the flexible display and the second device housing to travel symmetrically in opposite directions relative to the first device housing.

At 2713, the electronic device of 2712 further comprises a tensioner coupled between the display mover and the second end of the flexible display. At 2714, the tensioner of 2713 comprises a plurality of springs coupled between the second end of the flexible display and the display mover. At 2714, the plurality of springs applies a loading force biasing the second end of the flexible display toward the display mover.

At 2715, the electronic device of 2713 further comprises rotor positioned within a curvilinear section of the flexible display and a sleeve chassis coupled to the rotor. At 2715, the tensioner applies a loading force reducing slack in portions of the flexible display passing across the sleeve chassis.

At 2716, the actuator of 2712 comprises one or more springs coupled to the display mover on a first side of the reverse motion link and to the housing mover on a second side of the reverse motion link. At 2716, the one or more springs bias the display mover away from the housing mover.

At 2717, the actuator of 2712 comprises at least one motor coupled to at least one timing belt. At 2717, the display mover and the housing mover are each coupled to the at least one timing belt such that they move symmetrically in opposite directions when the at least one timing belt is actuated.

At 2718, the actuator of 2712 comprises a first drive screw, a second drive screw, and a gear assembly coupled between the first drive screw and the second drive screw. Of course, as shown in FIG. 25 above, the actuator could comprise a third drive screw and fourth drive screw mirrored on the other side of the device. At 2718, the display mover is coupled to the first drive screw and the housing mover is coupled to the second drive screw such that the display mover and the housing mover move symmetrically in opposite directions when the first drive screw and the second drive screw rotate.

At 2719, the actuator of 2712 comprises a first rack coupled to the display mover, a second rack coupled to the housing mover, and a pinion engaging the first rack and the second rack to cause the display mover and the housing mover to travel symmetrically in opposite directions.

At 2720, an electronic device comprises a first device housing slidably coupled to a second device housing. At 2720, the electronic device comprises a flexible display having a first end and a second end.

At 2720, the electronic device comprises a reverse motion link causing a display mover coupled to the second end of the flexible display and a housing mover coupled to the second device housing to travel symmetrically in opposite directions. At 2720, the electronic device comprises a tensioner coupled between the second end of the flexible display and the display mover and applying a loading force removing slack from the flexible display.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first device housing and a second device housing that is slidable relative to the first device housing;
   a flexible display;
   a slider framework fixedly coupled to the first device housing;
   a display mover slidably coupling the flexible display to the slider framework;
   a housing mover slidably coupling the second device housing to the slider framework; and
   an actuator coupled between the display mover and the housing mover, the actuator causing the display mover and the housing mover to slide symmetrically in opposite directions along the slider framework when the second device housing slides relative to the first device housing between a closed position and an open position;
   wherein the actuator comprises a spring actuator;
   the spring actuator biasing the display mover away from the housing mover when the electronic device is in either the closed position or the open position and comprising:
      a first pivoting header coupled to the display mover at a first pivot point;
      a second pivoting header coupled to the housing mover at a second pivot point;
      a pivoting arm comprising:
         a first end pivotally coupled to the first pivoting header;
         a second end pivotally coupled to the second pivoting header; and
         a central section pivotally coupled to the slider framework; and
      one or more leaf springs coupled between the first pivot point and the second pivot point.

2. The electronic device of claim 1, wherein the one or more leaf springs compress when the first device housing and the second device housing are between the closed position and the open position.

3. The electronic device of claim 2, wherein the one or more leaf springs apply a loading force biasing the electronic device toward the closed position or the open position.

4. The electronic device of claim 1, further comprising a tensioner coupled to the display mover.

5. The electronic device of claim 1, the one or more leaf springs comprising a plurality of leaf springs.

6. The electronic device of claim 5, wherein the plurality of leaf springs compress when the display mover and housing mover pass each other as the first device housing and the second device housing move between the open position and the closed position.

7. The electronic device of claim 1, further comprising a tensioner coupled to the display mover and comprising one or more adjustment lugs allowing a position of the tensioner to be moved along the display mover.

8. The electronic device of claim 1, further comprising a tensioner coupled between the display mover and the flexible display.

9. The electronic device of claim 8, the tensioner comprising one or more springs applying a loading force biasing an end of the flexible display toward an end of the first device housing.

10. The electronic device of claim 8, further comprising a rotor positioned within a curvilinear section of the flexible display, wherein the tensioner biases an end of the flexible display away from the rotor.

11. The electronic device of claim 9, further comprising a spring detent arresting travel of one of the housing mover or the display mover.

12. An electronic device, comprising:
    a first device housing slidably coupled to a second device housing;
    a flexible display comprising a first end coupled to the second device housing and a second end; and
    a reverse motion link comprising a display mover coupled to the second end of the flexible display, a housing mover coupled to the second device housing, and a spring actuator causing the second end of the flexible display and the second device housing to travel symmetrically in opposite directions relative to the first device housing and comprising:
       a first pivoting header coupled to the display mover at a first pivot point;
       a second pivoting header coupled to the housing mover at a second pivot point;
       a pivoting arm comprising:
          a first end pivotally coupled to the first pivoting header;
          a second end pivotally coupled to the second pivoting header; and
          a central section pivotally coupled to a slider framework of the reverse motion link; and
       one or more leaf springs coupled between the first pivot point and the second pivot point.

13. The electronic device of claim 12, further comprising a tensioner coupled between the display mover and the second end of the flexible display.

14. The electronic device of claim 13, the tensioner comprising a plurality of springs coupled between the second end of the flexible display and the display mover, the plurality of springs applying a loading force biasing the second end of the flexible display toward the display mover.

15. The electronic device of claim 13, further comprising:
    a rotor positioned within a curvilinear section of the flexible display; and
    a sleeve chassis coupled to the rotor;
    wherein the tensioner applies a loading force reducing slack in portions of the flexible display passing across the sleeve chassis.

16. The electronic device of claim 13, the tensioner defining one or more adjustment lugs allowing a position of the tensioner on the display mover to be adjusted.

17. The electronic device of claim 12, the spring actuator biasing the display mover away from the housing mover when the electronic device is in either a closed position or an open position.

18. The electronic device of claim 12, further comprising a tensioner coupled to the display mover by one or more screws.

19. The electronic device of claim 12, the reverse motion link comprising one or more detents configured to arrest travel of one or more of the housing mover or the display mover.

20. An electronic device, comprising:
- a first device housing slidably coupled to a second device housing;
- a flexible display having a first end and a second end;
- a reverse motion link comprising a spring actuator causing a display mover coupled to the second end of the flexible display and a housing mover coupled to the second device housing to travel symmetrically in opposite directions; and
- a tensioner coupled between the second end of the flexible display and the display mover and applying a loading force removing slack from the flexible display;

wherein the spring actuator comprises:
- a first pivoting header coupled to the display mover at a first pivot point;
- a second pivoting header coupled to the housing mover at a second pivot point;
- a pivoting arm comprising:
  - a first end pivotally coupled to the first pivoting header;
  - a second end pivotally coupled to the second pivoting header; and
  - a central section pivotally coupled to a slider framework of the reverse motion link; and
- one or more leaf springs coupled between the first pivot point and the second pivot point.

* * * * *